US008396182B2

(12) United States Patent  (10) Patent No.: US 8,396,182 B2
Smith et al.  (45) Date of Patent: Mar. 12, 2013

(54) METHOD AND APPARATUS TO SHIELD A NUCLEAR FUEL ASSEMBLY WITH REMOVABLE DEBRIS SHIELD IN UPPER TIE

(75) Inventors: David Smith, Leland, NC (US); Michael DeFilippis, Wilmington, NC (US); Gerald A. Luciano, Wilmington, NC (US); Michael Kiernan, Wilmington, NC (US); Carlton Clark, Wilmington, NC (US); Andrew K. Langston, Wilmington, NC (US)

(73) Assignee: Global Nuclear Fuel—Americas, LLC, Wilmington, NC (US)

( * ) Notice: Subject to any disclaimer, the term of this patent is extended or adjusted under 35 U.S.C. 154(b) by 1114 days.

(21) Appl. No.: 12/323,739

(22) Filed: Nov. 26, 2008

(65) Prior Publication Data
US 2009/0080590 A1    Mar. 26, 2009

Related U.S. Application Data

(63) Continuation-in-part of application No. 11/848,414, filed on Aug. 31, 2007.

(51) Int. Cl.
    *G21C 19/00* (2006.01)
(52) U.S. Cl. .......................... 376/260; 376/268; 376/277
(58) Field of Classification Search .................. 376/260, 376/268, 277
    See application file for complete search history.

(56) References Cited

U.S. PATENT DOCUMENTS

| 3,864,211 A | 2/1975 | King et al. |
| 4,828,791 A | 5/1989 | DeMario |
| 5,024,806 A | 6/1991 | Cioffi et al. |
| 5,030,412 A | 7/1991 | Yates et al. |
| 5,037,605 A | 8/1991 | Riordan, III |
| 5,094,802 A | 3/1992 | Riordan, III |
| 5,100,611 A | 3/1992 | Nylund |
| 5,345,483 A | 9/1994 | Johansson et al. |
| 5,361,287 A | 11/1994 | Williamson |
| 5,384,814 A | 1/1995 | Matzner et al. |
| 5,438,598 A | 8/1995 | Attix |
| 5,479,461 A | 12/1995 | Kilian |

(Continued)

FOREIGN PATENT DOCUMENTS

| EP | 0 418628 B1 | 3/1993 |
| EP | 0 289829 B1 | 6/1993 |

(Continued)

OTHER PUBLICATIONS

Gunnar Vesterlund & Sigvard Junkrans, "Perspectives on LWR Fuel Development", The Uranium Institute, Twenty Third Annual International Symposium 1998, printed Sep. 19, 2008, 5 pages.

*Primary Examiner* — Timothy A Brainard
(74) *Attorney, Agent, or Firm* — Nixon & Vanderhye P.C.

(57) ABSTRACT

A method to capture, retain and remove debris falling into a nuclear reactor fuel bundle assembly including a bundle of fuel rods mounted below an upper tie plate and housed in a hollow metal channel, the method includes: inserting a debris shield in the upper tie plate; maintaining the shield in the upper tie plate and above the fuel rods, and water rods, while the fuel bundle assembly is in an operating nuclear reactor core; capturing debris falling in the fuel assembly on the debris shield; after capturing the debris, removing the fuel bundle assembly with the inserted debris shield from the nuclear reactor core to a maintenance/fuel inspection pool and thereafter removing the debris shield from the upper tie plate, cleaning and then reinserting the cleaned debris shield back into the upper tie plate, and moving the fuel bundle assembly from the maintenance/fuel inspection pool back into the nuclear reactor core.

27 Claims, 15 Drawing Sheets

U.S. PATENT DOCUMENTS

| | | |
|---|---|---|
| 5,490,189 A | 2/1996 | Schechter |
| 5,524,031 A | 6/1996 | Kilian |
| 5,627,866 A | 5/1997 | Dunlap et al. |
| 5,748,694 A | 5/1998 | King |
| 5,787,140 A | 7/1998 | Dunlap et al. |
| 5,809,101 A | 9/1998 | Dunlap et al. |
| 6,581,667 B2 | 6/2003 | Waring |
| 6,608,880 B2 | 8/2003 | Smith et al. |
| 6,690,758 B1 | 2/2004 | Elkins |
| 2006/0018422 A1 | 1/2006 | Mayer |
| 2006/0283790 A1 | 12/2006 | Elkins et al. |
| 2007/0291893 A1 | 12/2007 | Makovicka |
| 2009/0060114 A1 | 3/2009 | DeFilippis et al. |
| 2009/0092217 A1 | 4/2009 | DeFilippis et al. |

FOREIGN PATENT DOCUMENTS

| | | |
|---|---|---|
| EP | 0 422950 B1 | 8/1994 |
| FR | 1213496 A2 | 4/1960 |
| JP | 54087378 A * | 7/1979 |
| WO | 03009306 A2 | 1/2003 |
| WO | 03009306 A3 | 1/2003 |

* cited by examiner

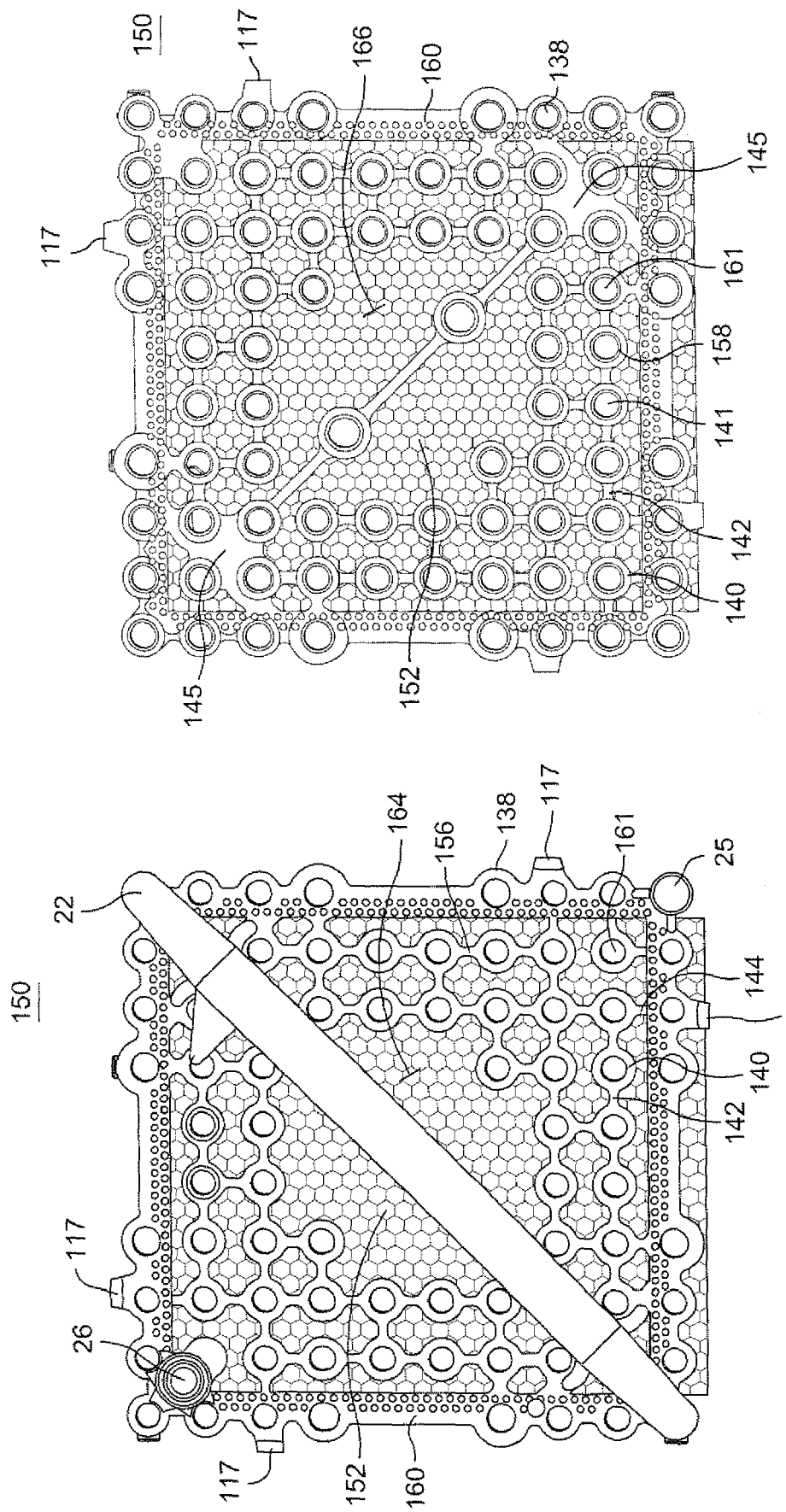

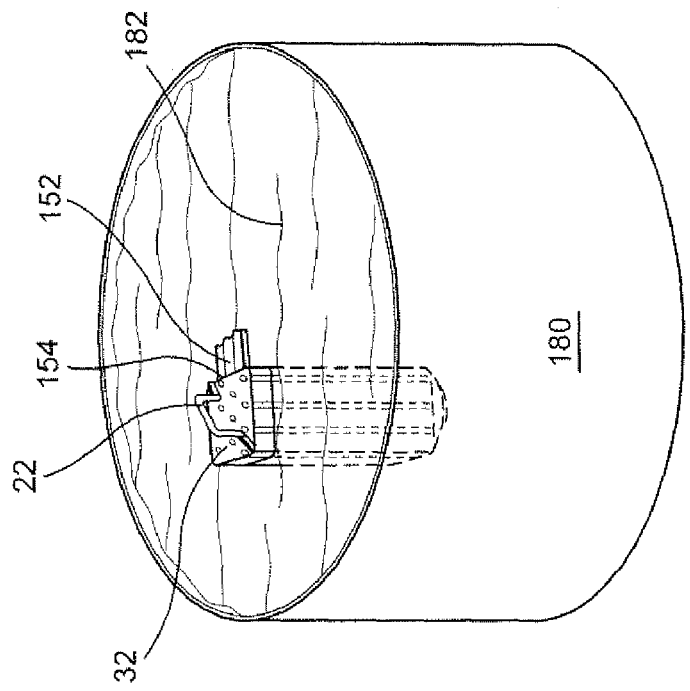
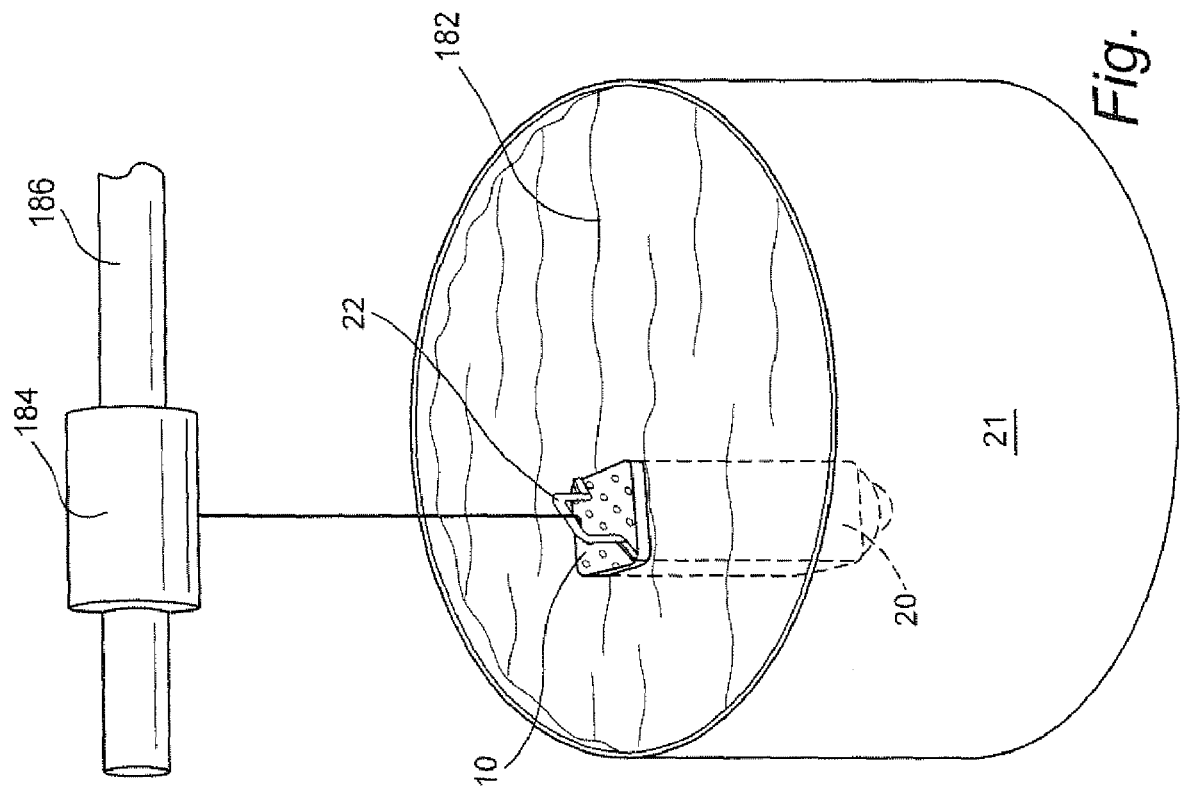

METHOD AND APPARATUS TO SHIELD A NUCLEAR FUEL ASSEMBLY WITH REMOVABLE DEBRIS SHIELD IN UPPER TIE

RELATED APPLICATION

This application is a continuation-in-part (CIP) of pending U.S. patent application Ser. No. 11/848,414, filed on Aug. 31, 2007, the entirety of which is incorporated by reference.

BACKGROUND OF THE INVENTION

The present invention relates to a method for shielding from debris, a nuclear fuel assembly including a fuel bundle and a upper tie plate for supporting the fuel assembly and, particularly, relates to a debris shield that is releasable, for the purpose of cleaning or replacement, from an Upper Tie Plate (UTP) of the fuel assembly.

In a nuclear fuel assembly, liquid coolant/moderator flows into the assembly thru the bottom and exits as a water and steam mixture from the top during normal operation. The core of a nuclear fuel reactor includes a plurality of fuel assemblies arranged in vertical side-by-side relation, each containing a bundle of fuel rods. The fuel assemblies include a fuel bundle and a housing formed by a hollow metal channel. The fuel bundle includes an array of parallel fuel rods, water rods and one or more tie plates, spacers, and finger springs, that support the rods in the bundle. Generally, a fuel bundle includes an upper tie plate near the top of the bundle, which is removable and a lower tie plate at the bottom of the bundle, which is conventionally a non-removable unit.

Debris may fall through a conventional upper tie-plate and become lodged within the fuel bundle where the debris may cause fuel rod fretting during normal reactor operating conditions. Fretting is potentially damaging to the fuel rods, resulting in what is typically known as a "leaker".

Conventional efforts to address debris falling down into a fuel assembly typically focus on the prevention of debris from entering within the coolant itself and coolant flow passages, prior to coolant flow entering the fuel assemblies within the core. Conventional efforts typically involve administrative controls regarding the treatment of coolant flow passages and handling of fuel assemblies such that debris does not enter the passages of the fuel assemblies. These controls are designed to alleviate the sources of debris such that debris does not fall down into fuel assemblies. Nevertheless, there is a risk that debris will fall down into a fuel assembly, especially while the coolant flow stops and the reactor core is open or when service work is preformed on the core.

There is a long felt need for procedures and special devices to ensure that debris does not fall into fuel assemblies from above, especially during refuel operations, fuel inspections and when the coolant is in a reverse coolant flow pattern. Further there is a long felt need for efficient and non-intrusive methods to insert, remove and clean devices associated with the UTP that capture debris that would otherwise flow down into a fuel bundle assembly from above.

BRIEF DESCRIPTION OF THE INVENTION

A nuclear reactor fuel assembly comprising: a fuel bundle including an array of fuel rods mounted in an upper tie plate and housed within a hollow metal channel, and a debris shield in the upper tie plate and above the fuel rods, wherein the debris shield has a surface at least co-extensive with an at least partially open area of the upper tie plate.

A nuclear reactor fuel assembly has been developed including: an upper tie plate having apertures to receive and support fuel rods of a fuel bundle; the fuel bundle including an array of the fuel rods mounted and housed in walls of a hollow metal channel, and a porous debris shield which can be removable from the upper tie plate, attached as a permanent integrated structure in the upper tie plate, or mounted such that the debris shield remains over the fuel bundle while the upper tie plate is removed, wherein the shield is porous.

A nuclear reactor fuel assembly has been developed comprising: a fuel bundle including an array of fuel rods mounted in an upper tie plate and housed within a hollow metal channel, and a debris shield which can be removed from the upper tie plate, fixed to the upper tie plate or remain above the fuel rods while the upper tie plate is removed, wherein the debris shield has a surface at least co-extensive with an open area of the fuel bundle inside the hollow metal channel.

A method has been developed to prevent debris falling into a nuclear reactor fuel assembly including a bundle of fuel rods mounted within or below an upper tie plate and housed in a hollow metal channel, the method comprising: inserting a debris shield which can be a removable unit, attached as a permanent integrated structure within the upper tie plate or remain attached to the fuel bundle while the upper tie plate is removed; maintaining the shield within the upper tie plate or above the fuel rods, while the fuel assembly is in an operating nuclear reactor core; flowing coolant through the bundle and the debris shield during operation of the nuclear reactor core, wherein the debris shield has the ability for capturing, screening, filtering, deflecting, and removing falling debris in the fuel assembly.

A nuclear reactor fuel assembly is disclosed comprising: a fuel bundle including an array of fuel rods housed within a hollow metal channel; an upper tie plate including a horizontal, rectangular frame having a rib to receive an upper end of a tie rod of the fuel bundle, wherein an outer surface of the frame is adjacent the hollow metal channel, and a debris shield in the upper tie plate and above the fuel rods, wherein the debris shield has a surface at least co-extensive with an at least partially open area of the upper tie plate.

A method is disclosed to capture and remove debris falling into a nuclear reactor fuel bundle assembly including a bundle of fuel rods mounted below an upper tie plate and housed in a hollow metal channel, the method comprising: inserting a debris shield in the upper tie plate; maintaining the shield in the upper tie plate and above the fuel rods, while the fuel bundle assembly is in an operating nuclear reactor core; flowing coolant through the fuel rods and the debris shield during operation of the nuclear reactor core; capturing debris falling in the fuel assembly on the debris shield; after capturing the debris, removing the fuel bundle assembly with the inserted debris shield from the nuclear reactor core to a maintenance/fuel inspection pool and thereafter may require removing the debris shield from the upper tie plate, performing at least one of (a) removing the captured debris from the removed debris shield and thereafter reinserting the debris shield back into the upper tie plate and (b) inserting another debris shield into the upper tie plate, and after the reinsertion of the debris shield or the insertion of the another debris shield, moving the fuel bundle assembly from the maintenance/fuel inspection pool to the nuclear reactor core once again.

A method is disclosed to capture and remove debris falling into a nuclear reactor fuel bundle assembly including a bundle of fuel rods mounted below an upper tie plate and housed in a hollow metal channel, the method comprising: inserting a debris shield in the upper tie plate; maintaining the shield in the upper tie plate and above the fuel rods, while the fuel bundle assembly is in an operating nuclear reactor core; flowing coolant through the fuel rods and the debris shield during operation of the nuclear reactor core; capturing debris falling in the fuel assembly on the debris shield; after capturing the debris, removing the fuel bundle assembly with the inserted debris shield from the nuclear reactor core to a maintenance or fuel inspection pool and thereafter may require removing the debris shield from the upper tie plate, performing at least one of (a) removing the captured debris from the removed debris shield and thereafter reinserting the debris shield back into the upper tie plate and (b) inserting another debris shield into the upper tie plate, and after the reinsertion of the debris shield or the insertion of the another debris shield, moving the fuel bundle assembly from the maintenance/fuel inspection pool to the nuclear reactor core once again.

A method is disclosed to seat an upper tie plate in a fuel bundle assembly for a nuclear reactor, wherein the fuel bundle assembly includes a bundle of fuel rods mounted below the upper tie plate and housed in a hollow metal channel, the method comprising: attaching a debris shield to upper portions of the water rods, and after attaching the debris shield, seating the upper tie plate over the debris shield and securing the upper tie plate to the tie rods of the fuel bundle assembly.

A method is disclosed to remove a fuel rod from a fuel bundle for a nuclear reactor, wherein the fuel bundle includes a bundle of fuel rods mounted below the upper tie plate, the method comprising: removing the upper tie plate from the fuel bundle, while the debris shield remains attached to an upper portion of at least one of the fuel rods or of a water rod, and after removing the upper tie plate, removing the fuel rod by lifting the rod up through the debris shield, while the debris shield remains attached to an upper portion of at least one of the fuel rods or of a water rod.

A fuel bundle is disclosed comprising: a plurality of fuel rods; an upper tie plate having a cavity to receive an upper tie plate debris shield, wherein the upper tie plate is not directly connected to the fuel rods; the upper tie plate debris shield is seated in the cavity and has at least one opening through which extends an upper end of one of the fuel rods.

BRIEF DESCRIPTION OF THE DRAWINGS

FIG. 3 shows a machined pocket for the debris shield to rest within the underside of the UTP and the various openings within the debris shield, which allows the upper end-plugs of the fuel rods and water rods to pass through both the debris shield and the upper tie plate that secures both components together into a single metal structure assembly.

FIG. 13 is a top-down view of the debris shield of the third embodiment of the upper tie plate with the debris shield fully seated and properly aligned for the insertion of the water rods and the upper end plugs of the fuel rods that aid to maintain the debris shield within the upper tie plate during core operations.

FIG. 14 is a bottom-up view of the debris shield of the third embodiment of the upper tie plate with debris shield showing proper alignment of the debris shield prior to the insertion of the upper end plugs of the water and fuel rods within the pin supports of the structure of the upper tie plate.

FIGS. 15a, 15b and 15c are schematic diagrams showing a maintenance/fuel inspection pool (typically near the reactor core) to receive fuel bundle assemblies that have been removed from the reactor core for maintenance and/or service work.

DETAILED DESCRIPTION OF THE INVENTION

Debris shields are disclosed herein that mitigate the entry of foreign material into the top of a nuclear fuel bundle assembly. The debris shields deflect, capture, screen and retain or aid in the removal of foreign particles introduced into the top of the fuel assembly. By preventing the entry of foreign particles into the nuclear fuel bundle assembly, the possibility of a fuel rod fretting failure is substantially reduced, if not eliminated. The debris shield may be a removable unit from the upper tie plate or a permanently integrated structure within or below the upper tie plate, but above the fuel and water rods. Preventing debris falling into the nuclear fuel bundle assembly is expected to assure the expected operational life of the nuclear fuel bundle assembly by reducing the risk of fuel rod failure and the premature discharge from the core of the reactor.

Figure 1:
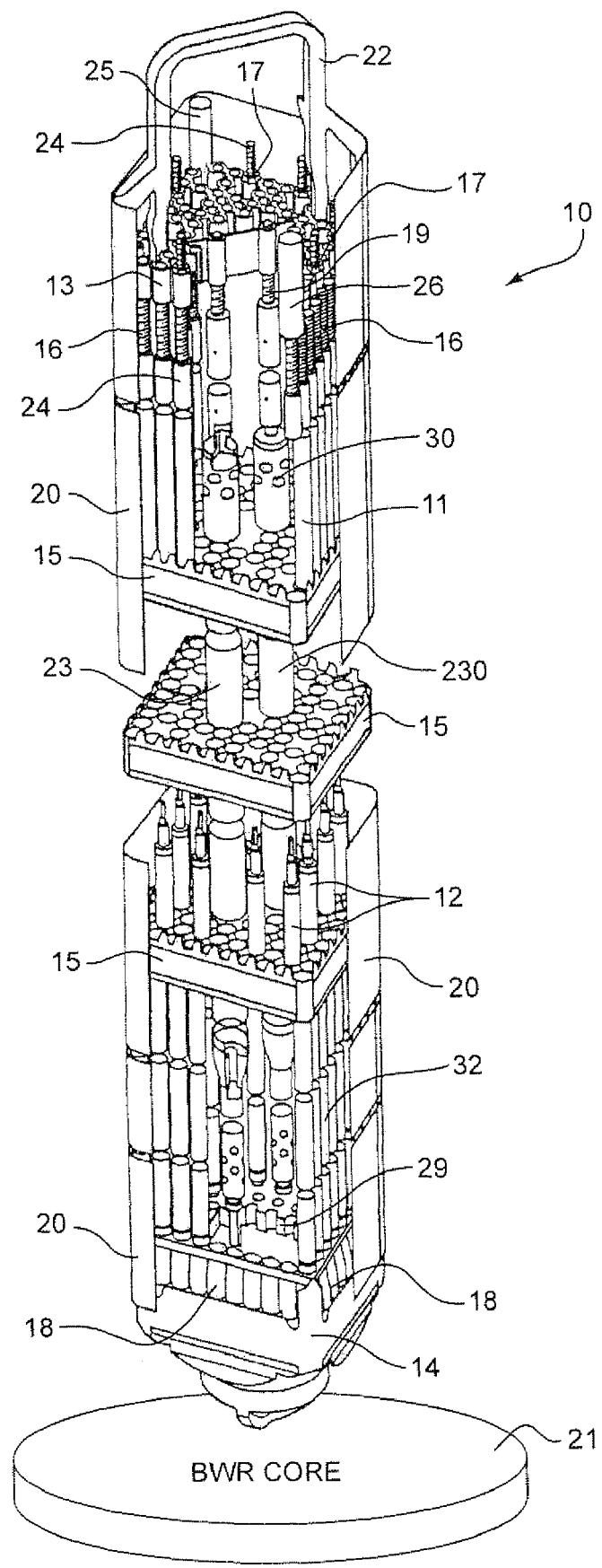
FIG. 1 is a side, partially open view of a conventional nuclear fuel bundle assembly, with a portion of the upper tie plate, lower tie plate, hollow metal channel, fuel rods and water rods cut away, for purposes of illustration.

FIG. 1 is a side view showing in cross-section of a conventional nuclear fuel bundle assembly 10 shaped generally as a vertical column with a square cross-section. The reactor core 21 includes many fuel assemblies arranged side by side in a predefined array.

The nuclear fuel bundle assembly typically includes, for example, an array of full-length fuel rods 11 and part-length fuel rods 12 arranged in parallel. The fuel rods are supported by an upper tie plate 13, a lower tie plate 14, lower grid 29 of the tie plate, which supports the rods within the nuclear fuel bundle. One or more spacers 15 arranged at locations along the length of the fuel rods. One or more water rods 23, 230 typically extend through the center of the array of fuel rods and are attached to the upper tie plate 13 by an upper end plug 30. The typical nuclear fuel bundle assembly 10 comprises the fuel rods 11, 12, water rods 23, 230, an upper and lower tie plates 13, 14, and tie rods 24, spacers 15, finger springs 18, expansion springs 16, and a hollow metal channel 20.

Fuel rod expansion springs 16 extend from the upper end plugs of 19, 30 and 28 on each of the water rods 23 and 230 and the full-length fuel rods 11 and the tie rods 24, to the under side of the upper tie plate 13. Hex nuts 17 are used to secure the threaded upper end plugs 28 of the tie rods 24, to the top of the upper tie plate 13, a lock tab washer 170 (FIG. 2) is used to keep the hex nut 17 secured to the tie rods 24. The tie rods 24 extend through the upper tie plate 13 of the tie plate. The opposite end of each tie rod is secured to the lower tie plate's grid 29, of a conventional nuclear fuel bundle assembly 10. The lower tie plate 14 includes finger springs 18 on the outer sidewalls of the lower tie plate 14 that engage a hollow metal channel 20 that provides a hollow housing for the nuclear fuel bundle assembly 10.

The hollow metal channel 20 is typically an elongated hollow metal tube, rectangular in cross-section and having a length that extending from the upper tie plate 13 to the lower tie plate 14. The hollow metal channel 20 covers the fuel rods and water rods in the nuclear fuel bundle assembly 10. Channel posts 25 and channel post 26, located on opposite corners of the upper tie plate 13, provide guides to align the channel onto the fuel bundle 32. A channel fastener clip (not shown) secures the hollow metal channel 20 to the threaded channel posts 26, on one side of an upper tie plate 13. The threaded channel post 26 is used to insure correct ordination and alignment of the hollow metal channel 20 to the fuel bundle 32 during the channeling operation. Otherwise, the hollow metal channel 20 cannot be securely fastened to the upper tie plate 13 by the channel fastener (not shown) as required. Generally, a U-shaped lifting handle 22 is attached as part of the upper tie plate 13. The handle 22 may be used to raise and lower the nuclear fuel bundle assembly 10 into a reactor core 21 or to otherwise move the assembly around the facility as needed.

Debris may enter the top of a conventional nuclear fuel bundle assembly 10, especially during non-operating or operating conditions such as, refuel, new fuel receipt, transport to and from the core, when the coolant flow stops flowing upward through the core, and when moderator flow may be stagnate or reversed. Debris falling into the top of the fuel bundle assembly may become lodged in the grid of the tie plate, spacer bracket, between the fuel rods or between a hollow metal channel wall and a fuel rod. The crevices in the fuel bundle can trap the debris within the fuel bundle. The debris may fall through an upper tie plate 13 and become lodged within a location inside the nuclear fuel bundle assembly 10 where it could cause fuel rod fretting during normal reactor operating conditions.

Figure 2:
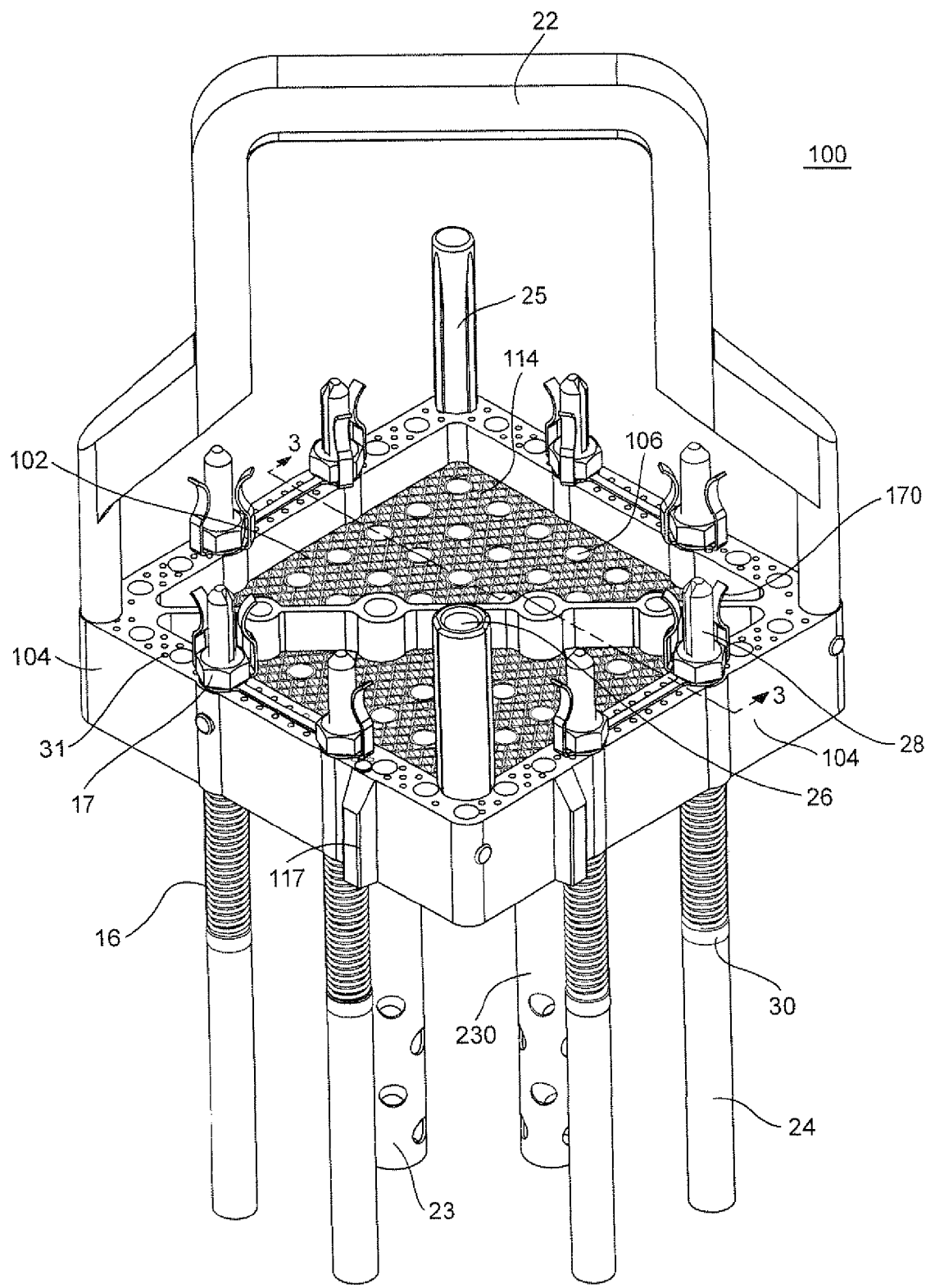
FIG. 2 is a perspective view of the top and sides of a first embodiment of an upper tie plate having an internal debris shield that can be a removable unit, attached as a permanent integrated structure within the upper tie plate to prevent debris from falling into the fuel bundle assembly, or the debris shield may be loaded from the bottom side of the upper tie plate and secured therein by special fasteners or by the tie rods themselves.
Figure 3:
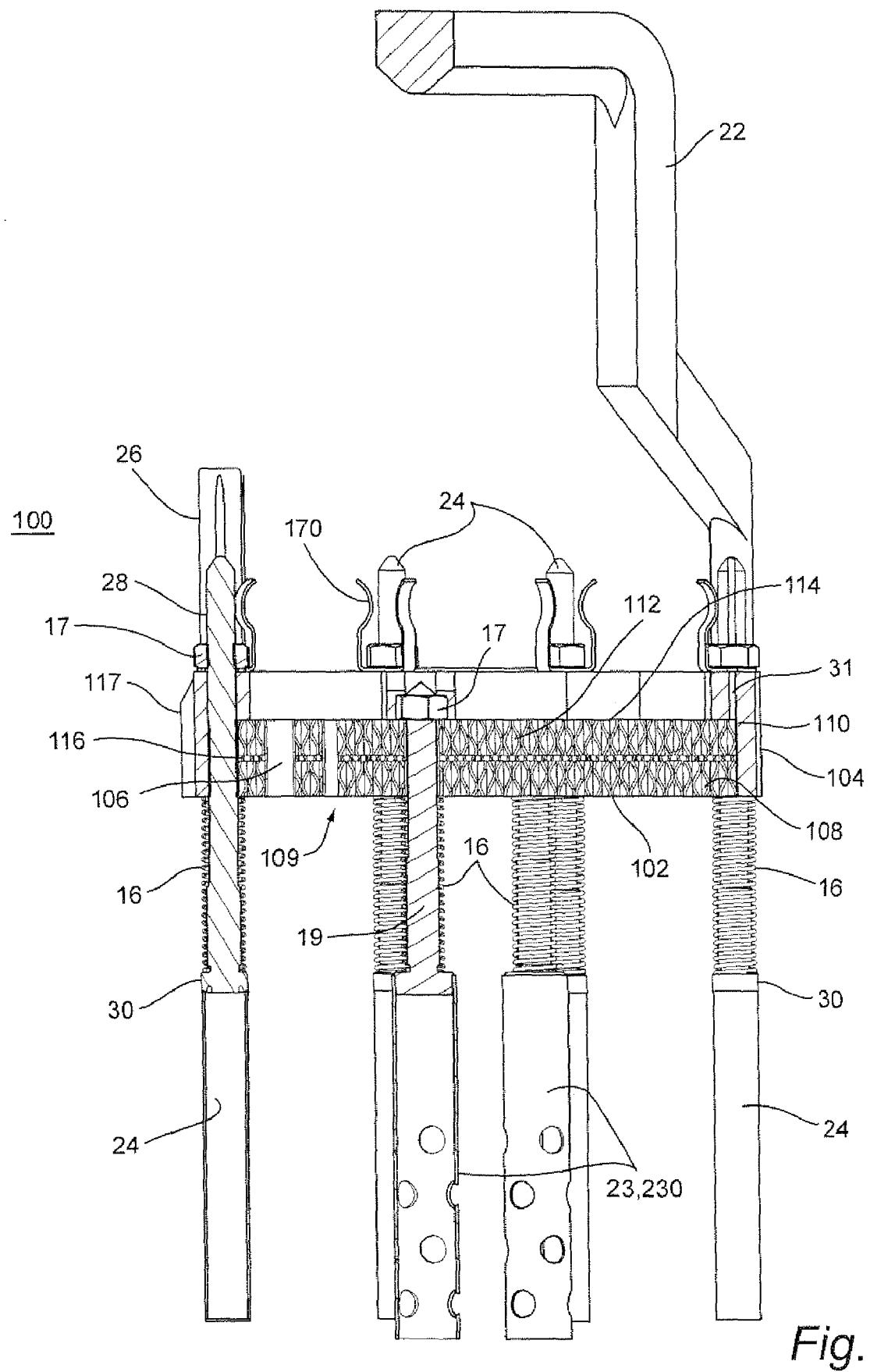
FIG. 3 is a sectioned view showing the first embodiment of the upper tie plate and debris shield shown in a cross-section taken along line 3-3 of FIG. 2.
Figure 4:
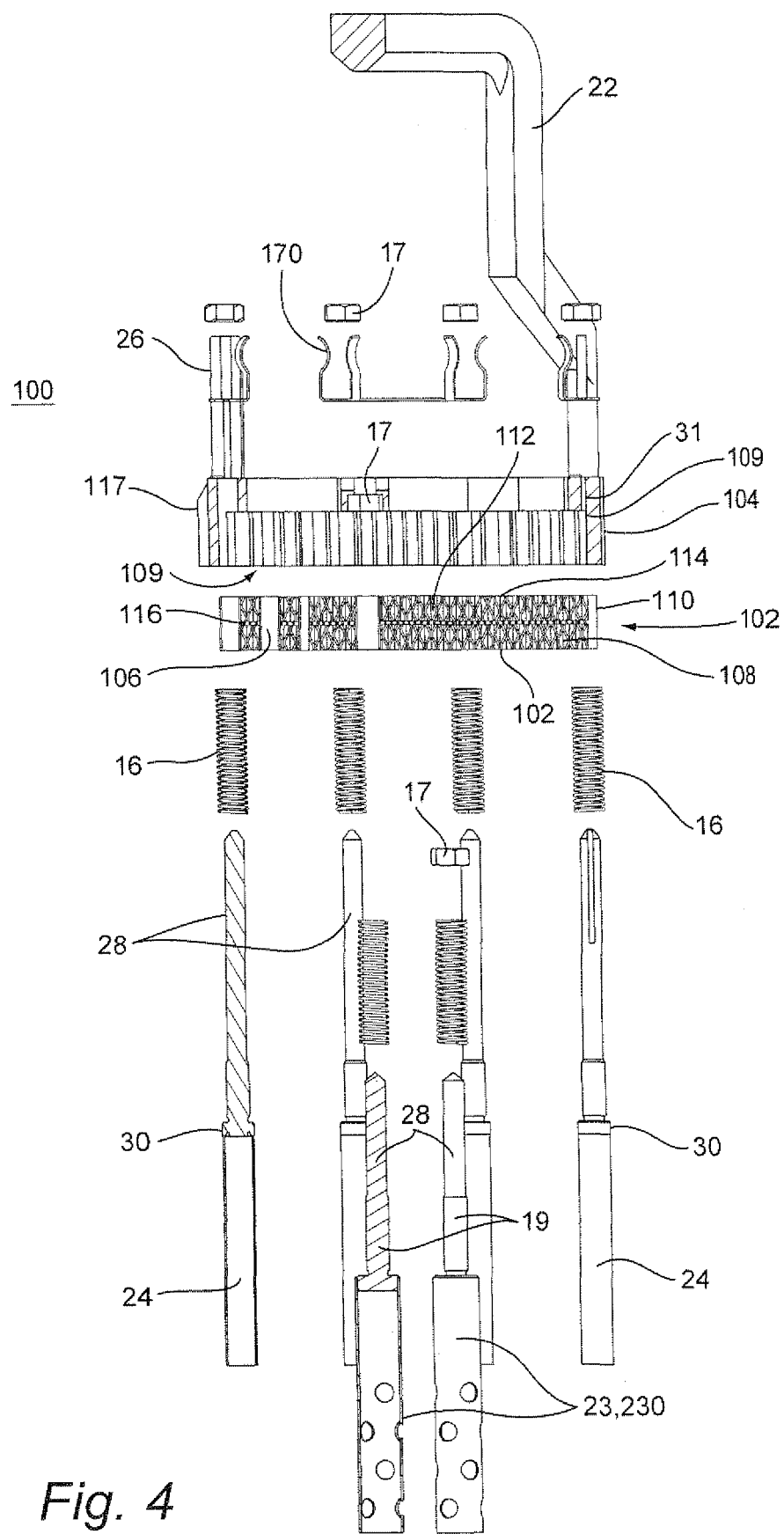
FIG. 4 is an exploded view of the first embodiment showing the upper tie plate, the debris shield, and the fuel and water rods, springs, lock tab washer and the hex nut fasteners, separated vertically.

FIGS. 2, 3 and 4, show an upper tie plate assembly 100 having an internal debris shield 102 (FIG. 2) that may be a removable unit or a permanent integrated structure within the upper tie plate. The shield 102 may be mounted to or integral within a horizontal support frame 104 of the assembly. The debris shield 102 fills an area enclosed by the horizontal support frame 104 of the upper tie plate. The debris shield may be inserted in the bottom of the upper tie plate or in a horizontal slot within the upper tie plate. The debris shield may or may not be integral with the frame structure of the upper tie plate, and may or may not be removable from the frame structure. The debris shield 102 is porous and screens or filters debris from the fluid flow through the nuclear fuel bundle assembly 10. Coolant flows through the debris shield preferably without substantial pressure loss through the debris shield 102.

An array of cylindrical pin supports 106 are provided by and are seated within openings in the debris shield 102 to allow the passage of the upper end plugs 28, of the fuel rods 24 and end plugs 30 of fuel rods 11, along with the upper end plugs 19 of the water rod. These cylindrical pin supports 106 provide structural support for the fuel rods and the water rods, in that the debris shield supports the threaded tie rods 24 and the threaded upper end plug on each of the water rods 23 and 230, and the non-threaded fuel rods 11, and the associated expansion springs 16.

In one embodiment, the cylindrical pin supports 106 have a diameter slightly greater than a diameter of a fuel rod with an associate expansion spring. The cylindrical pin, along with the fuel rod and expansion spring, may be removed from the debris shield by sliding the cylindrical pin, fuel rod and expansion spring up through the debris shield. Sliding the cylindrical pin, fuel rod and expansion spring up through an opening in the debris shield allows the fuel rod to be removed after the upper tie plate is removed and while the debris shield remains on the other fuel rods and water rods.

The upper end plugs 30, for the fuel rods 11 and the upper end plugs 19, for the threaded water rods 23, 230 and the threaded upper ends 28 of tie rods 24, extend through the pin supports 106 in the debris shield 102. A hex nut 17 is used to secure the threaded ends of the upper end plugs, such as of the water rods. Lock tab washers may be used on the hex nut. The hex nut 17 are general seated on an upper surface of the upper tie plate 13. The expansion springs 16 slide over the upper end plugs of the fuel and water rods and apply an upward bias force on a bottom surface of the debris shield 102. The extension of the upper end plug, on the fuel rods 24, passes through the pin support 106 in the debris shield 102.

The debris shield 102 is secured to the top of the threaded upper end plugs on each of the water rods 23 and 230 by hex nut 17. A recess cavity under the upper tie plate assembly 100 allows the hex nut 17 to be seated, in a locked position, on top of the debris shield and in the cavity of the upper tie plate. The cavity may be in the structural rib of the upper tie plate that extends diagonally across the top of the debris shield.

The fuel rods 11 and water rods 23, and 230 may not be directly secured to the top of the upper tie plate 13. They are secured indirectly to the upper tie plate through the debris shield. The upper tie plate may be removed while the debris shield remains attached to the upper ends of the water rods and, optionally, to upper ends of the fuel rods.

The upper tie plate assembly 100 may be removed from the nuclear fuel bundle assembly, while the internal debris shield 102 remains attached directly to the water rods 23, 230, and while the debris shield supports the fuel rods 11 and 24. If the debris shield 102 seats in a bottom cavity 109 of the upper tie plate, then the upper tie plate may be lifted to separated the debris shield 102 from the upper tie plate, as is shown in FIG. 4. To remove the upper tie plate, the hex nuts 17 and lock tab washers 170 are removed from the tie rods 24 that extend through the frame of the upper tie plate. Thereafter the upper tie plate may be lifted off the fuel bundle assembly. The debris shield 102 remains attached to the water rods 23, 230, while fuel rods 11 and 24 are supported and held securely in their original positions by extending through their respective cylindrical pin supports in the debris shield. The fuel rods are held in place without the aid of an upper tie plate, which has been removed. The upper tie plate may be replaced or repaired, because it can be removed from the nuclear fuel bundle separately from the debris shield and fuel and water rods.

Flow passages 108 through the debris shield 102 have an axis or axes that are preferably in a direction other than the vertical axis of the nuclear fuel bundle assembly 10. These non-straight flow passages stop, trap, and catch debris materials falling from above. By way of example, the passages through the debris shield 102 slant in a first direction in the upper half of the debris shield and slant in a second direction in the lower half of the debris shield, with a corner 116 formed between the two halves. The slanting passages of the debris shield 102 blocks light passing vertically through the debris shield. Due to the slanting of the flow passages 108 in the debris shield 102, it is not possible to look directly through the debris shield 102. The view is blocked because the flow passages 108 are not straight and have corners 116. Just as the view is blocked, debris is blocked and trapped in the corners 116 and between the two halves of the debris shield, by the non-straight lines within the flow passages 108.

In the example shown in FIGS. 2 to 4, the debris shield 102 is an arrangement of angled metal strips arranged side-by-side to form a chevron pattern 112 in cross-section that is generally perpendicular to the fuel bundle assembly 10. The passages 108 are formed between the side-by-side strips. Alternatively, the debris shield 102 may be formed of a porous material, such as a wire or fabric mesh, sponge, grid, array of crossing bars or slats, or other matrix material. The debris shield 102 is generally porous flat plates having perimeter edges 110 that abut the interior surfaces of the frame 104 of the upper tie plate assembly 100, from below.

The debris shield 102 preferably remains in the nuclear fuel bundle assembly 10 during operation of the nuclear reactor core 21. The debris shield 102 may have a porosity, open mesh or matrix structure that allows coolant, especially emergency coolant, to flow down through the debris shield without substantial creating flow resistance. The porous, chevron, mesh or matrix structure of the debris shield 102 blocks the passage of debris without substantial impending the general flow. The debris shield serves as a filter, or a screening device that allows the passage of fluids, such as coolant, and blocks the passage of foreign particulates. Preferably the debris shield 102 should have a pore size that minimizes the passage of most any foreign debris, without imposing a significant fluid pressure drop across the debris shield 102.

The debris shield 102 filters and captures debris in the coolant flow, especially debris flowing downward from above the fuel bundle assembly 10 and to the upper tie plate assembly 100. The passages 108 of the debris shield 102 are too narrow to allow larger debris particles to enter the passages or to pass all the way through. Larger debris particles are captured on an upper surface 114 of the debris shield 102. Smaller debris particles may enter the flow passages 108 of the debris shield 102 and become lodged within the corners and crevices 116 of the debris shield, such that they do not flow down below the upper tie plate assembly 100 and into the nuclear fuel bundle assembly 10.

The horizontal support frame 104 is preferably a rigid structural frame. The frame 104 may be porous, e.g., as have small vertical openings 31 to allow fluid to pass through the frame. These openings 31 have a small diameter to help block the passage of debris from entering the fuel bundle. The multiple openings 31 in the structure of the horizontal support frame 104 increase the effective flow area of passages through the upper tie plate assembly 100 to compensate or offset any flow restrictions due to the debris shield 102. Datum points 117, e.g., vertical ribs on the outer walls of the frame, attached or are integral within the horizontal support frame 104. The datum points aid in centering the hollow metal channel 20 about the upper tie plate 13. The datum points may also be used during fabrication of the nuclear fuel bundle assembly 10, to square the upper tie plate assembly 100 to the full-length fuel rods 11, the part length fuel rods 12, the tie rods 24, and the water rods 23 and 230.

Figure 3A:
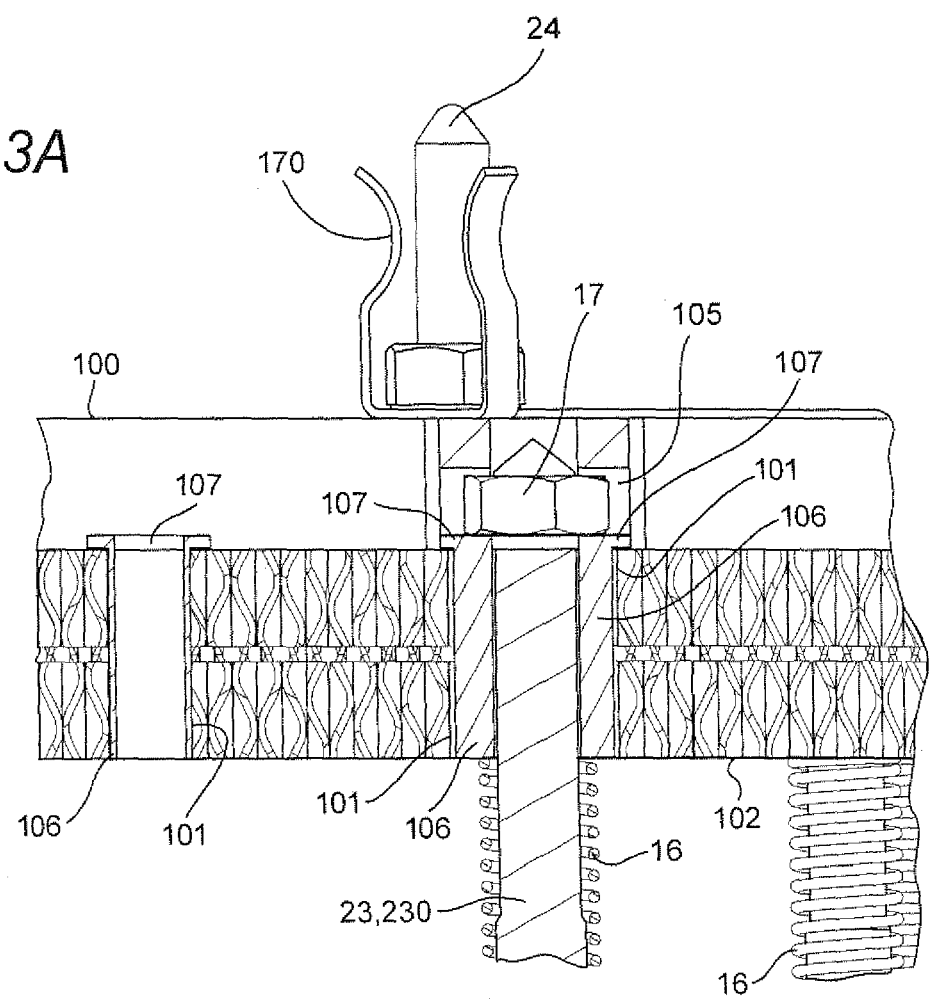
FIG. 3A is an enlarged sectioned view showing the connection between a threaded water rod and a debris shield which is seated in a lower cavity of an upper tie plate.

FIG. 3A is an enlarged sectioned view showing the connection between a water rod 23 or 230 11 and the debris shield 102 which is seated in a cavity of the upper tie plate 102. The water rod has a threaded upper end which receives a hex nut 17. A cylindrical pin support 106 is seated in a vertical opening 101 of the debris shield. The cylindrical support pin is hollow to receive the upper end of the water rod. The cylindrical support pin 106 may includes an upper flange 107, e.g., having a shape of a washer, that provides an abutment for an upper surface of the debris shield and, on the other side of the flange, an abutment for the hex nut 17. The upper tie plate has a recess 105 to receive the hex nut 17 and the upper tip of the water rod. The recess 105 may be shaped such that the hex nut cannot turn while seated in the recess. Further, the bottom edge of the cylindrical pin support 106 may be attached to an upper end of an expansion spring 16.

Figure 3B:
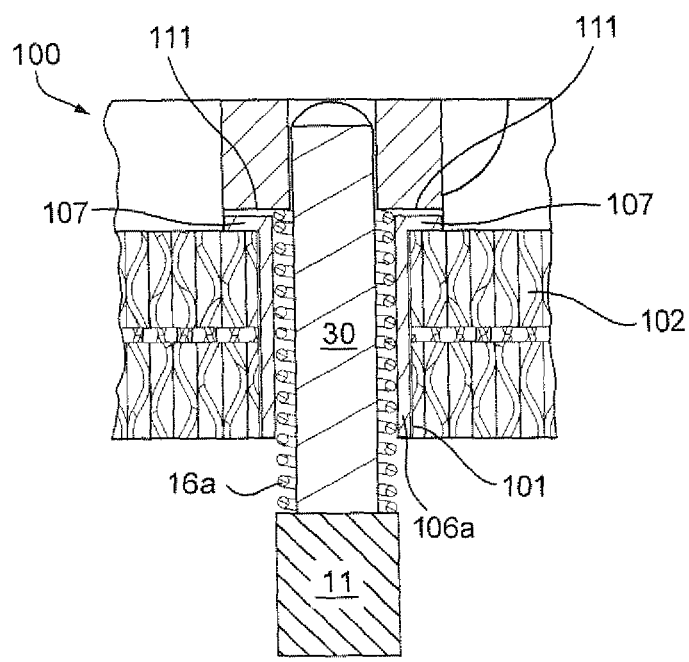
FIG. 3B is an enlarged sectioned view showing the connection between an unthreaded fuel rod and a debris shield which is seated in a lower cavity of an upper tie plate.

FIG. 3B is an enlarged sectioned view showing the connection between an unthreaded upper end plug 30 of a fuel rod 11 and a debris shield 102 which is seated in a lower cavity of an upper tie plate 100. The expansion spring 16a extends through the cylindrical pin support 106a and abuts against or is connected to a upper annular ledge 111 of a recess for the fuel rod 11 in the upper tie plate 100. The expansion springs on the unthreaded fuel rods may apply an upward basis force to the bottom surface of the upper tie plate.

The cylindrical pin support 106a is hollow and forms an aperture having a large diameter to receive the expansion spring. Accordingly, the cylindrical pin support 106a and the corresponding opening 101 in the debris shield may have larger diameters than do the cylindrical pin support 106 (FIG. 3A) for the water rod and the corresponding opening 101 for the pin support 106. When the upper tie plate 100 is removed, the expansion spring 116 no longer abuts or is disconnected from the ledge of the upper tie plate. The fuel rod and expansion spring may be lifted up through the debris shield to be removed from the fuel assembly.

Figure 5:
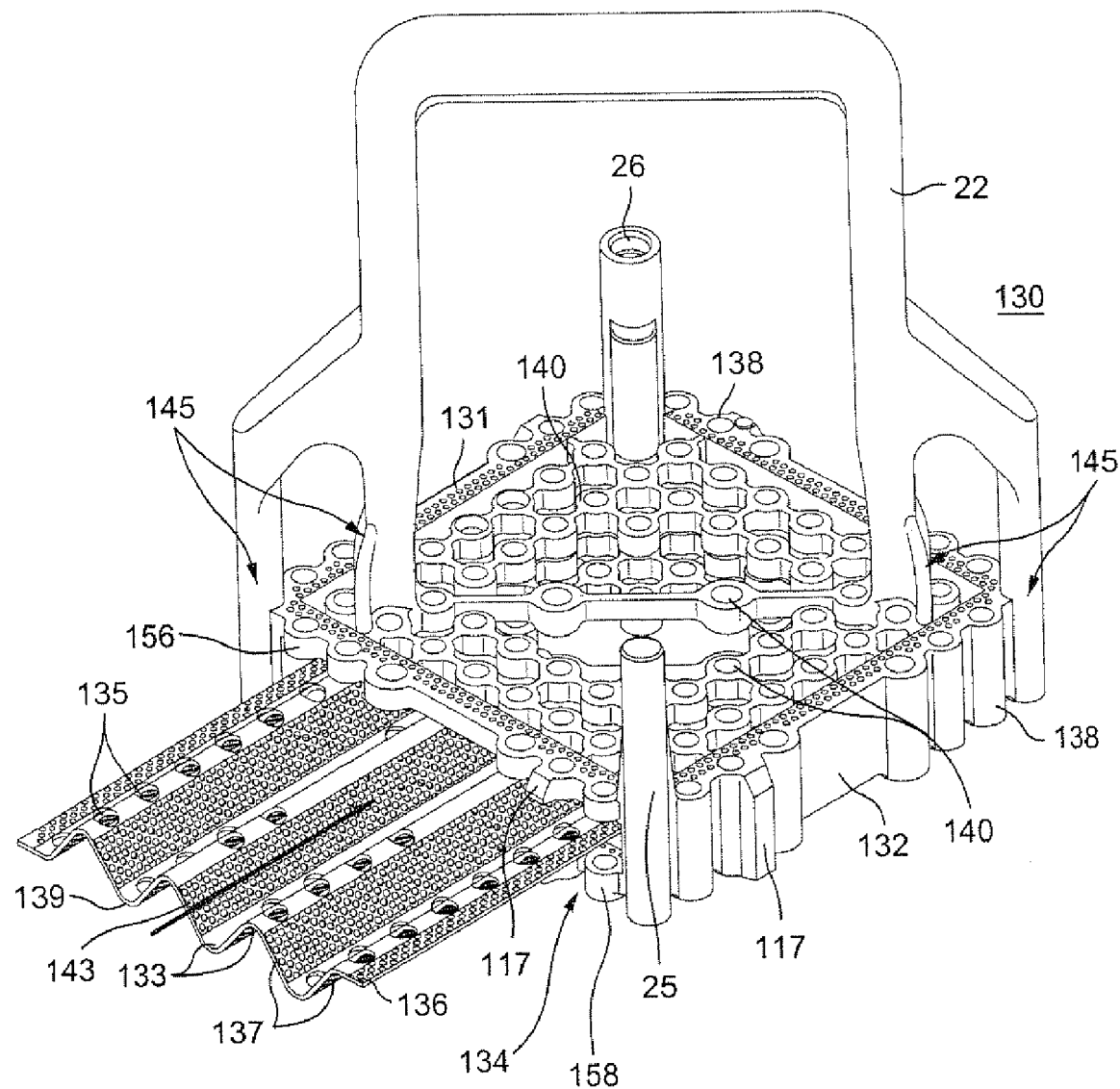
FIG. 5 is a perspective view of the top and sides of a second embodiment of an upper tie plate having a removable internal debris shield, wherein the debris shield which can be a removable unit or attached as a permanent integrated structure within the upper tie plate, and the shield is shown extending partially out of the upper tie plate.
Figure 6:
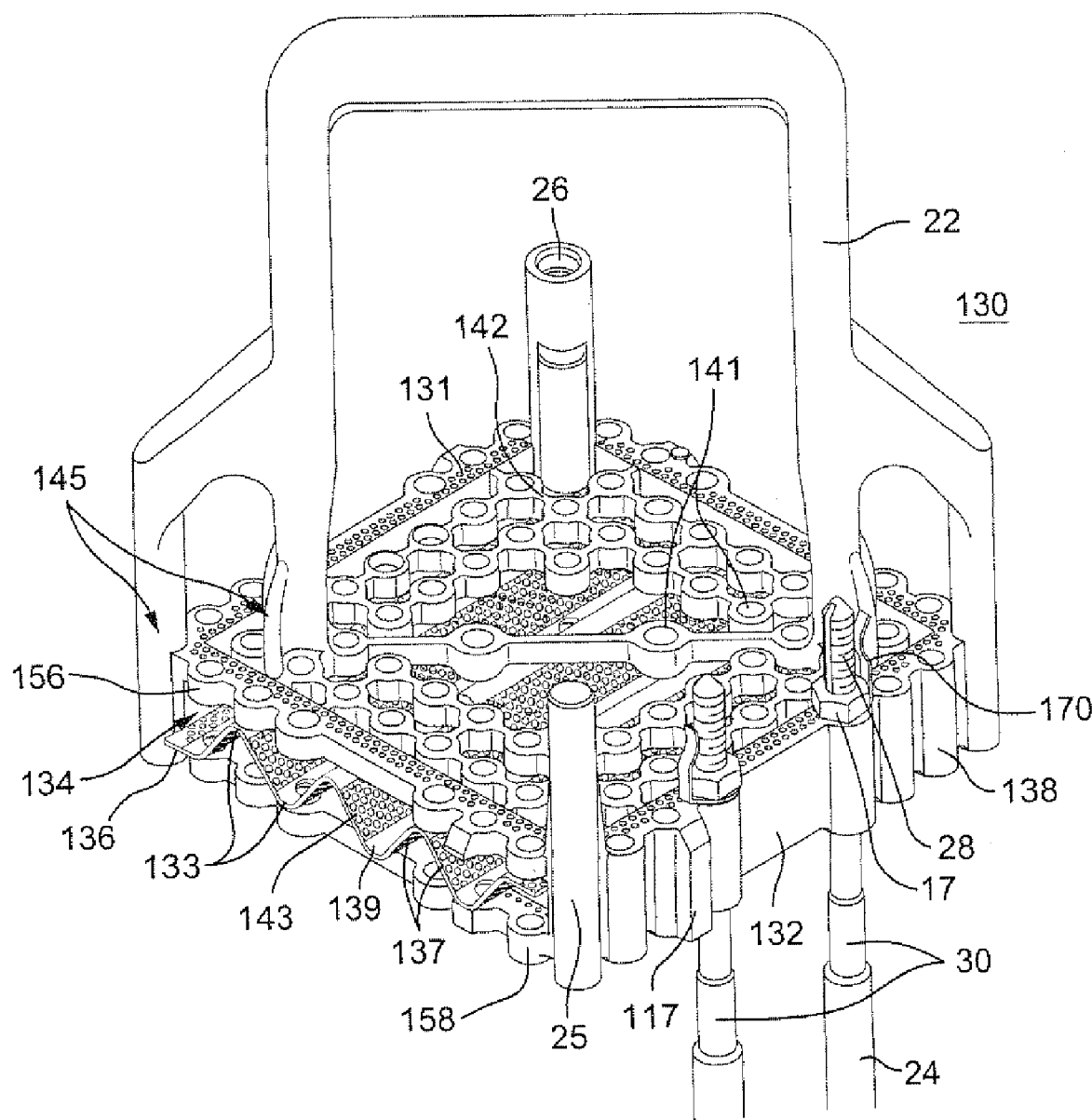
FIG. 6 is a perspective view of the top and sides of the second embodiment of an upper tie plate having a removable internal debris shield, wherein the shield is fully inserted into the upper tie plate. The fuel rod pin passages in the debris shield which align with an upper grid and a lower grid in the upper tie plate once the debris shield is fully seated within the upper tie plate.

FIGS. 5 and 6 are perspective views of the side and top of an alternative upper tie plate assembly 130 having a horizontal support frame 132 with a horizontal slot 134 to receive a debris shield 136 that can be either a removable unit or a permanent integrated structure within the upper tie plate. The debris shield shown in FIG. 5 is a removable debris shield and is shown partially removed from the horizontal support frame 132 in that figure. During operation the debris shield 136 is fully inserted into the slot 134 and enclosed by the horizontal support frame 132, as is shown in FIG. 6.

The upper tie plate assembly 130 includes an upper tie plate handle 22 that is attached or integral with the horizontal support frame. The horizontal support frame 132 may include a rectangular outer support wall structure having hollow ribs 138, which may receive tie rod end couplings, e.g., threaded pins of tie rods 24 and provides backing for the expansion springs 16 of tie rods. The horizontal support frame may be porous, e.g., have small vertical openings 131 to allow fluid to pass through the horizontal support frame and block the passage of foreign debris. The openings in the horizontal support frame increase the effective flow area of passages through the upper tie plate 130 and thereby compensate or offset any flow restrictions due to the debris shield 136. Datum points 117 attached to the horizontal support frame 132 that center the hollow metal channel 20 with the upper tie plate and are used during fabrication to square the upper tie plate 130 to the full-length fuel rods 11, the part length fuel rods 12, the tie rods 24, and the water rods 23 and 230.

Figure 7:
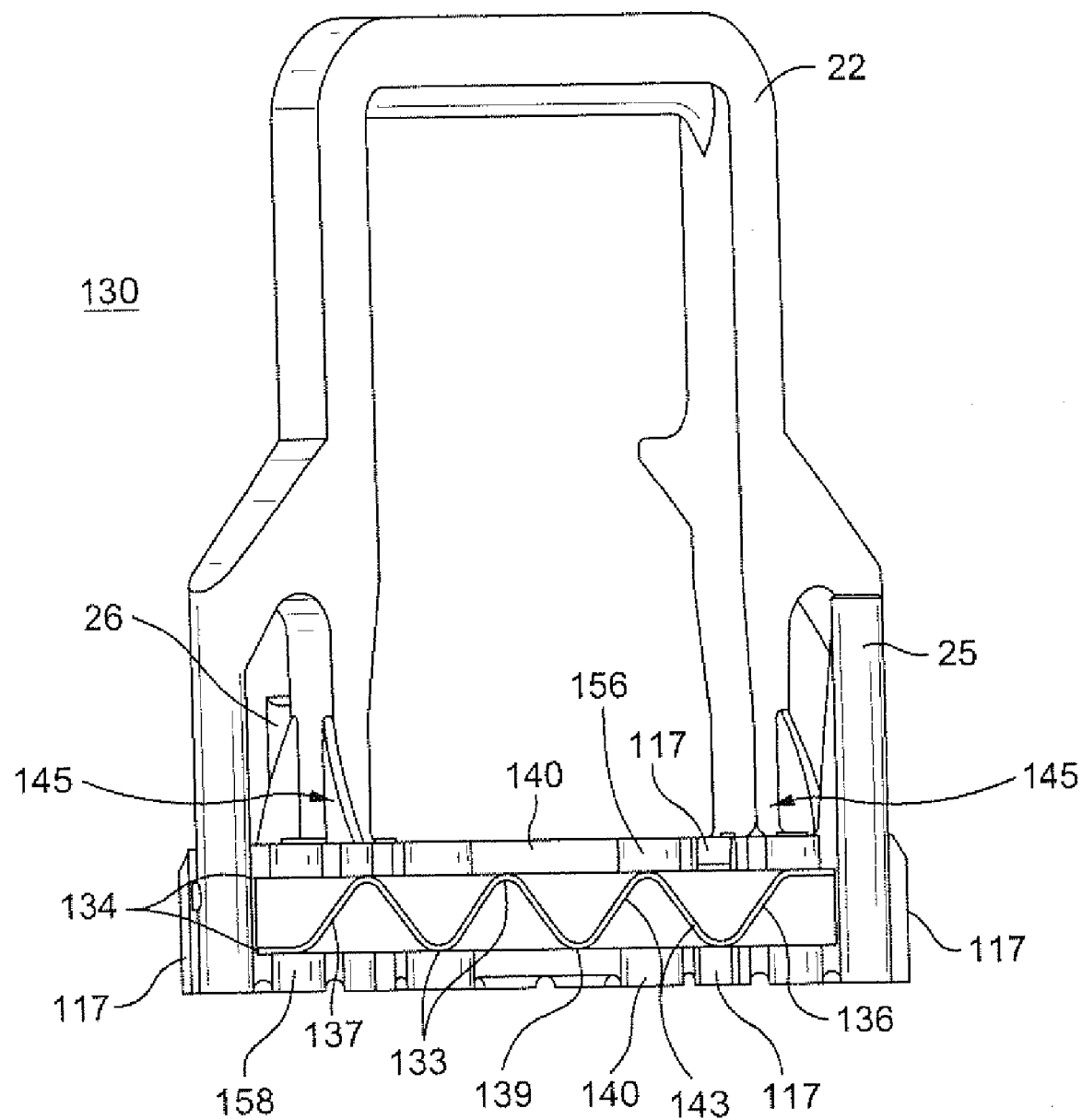
FIG. 7 is a perspective side view showing the second embodiment of the upper tie plate and debris shield, after being fully inserted from the side.

FIG. 7 is a side view of the upper tie plate assembly 130 having a horizontal support slot 134 and the debris shield plate 136 in the slot. The debris shield 136 may be a perforated flat plate having a wavy cross-sectional shape that results in openings in the debris shield that slant 143 with respect to the vertical axis of the nuclear fuel bundle assembly 10. The perforations may be machined, e.g., electrical discharge machining, punched, drilled or formed by casting. The perforations 143 are small to prevent the passage of foreign debris. The perforations 143 are slanted due to the wavy cross-sectional shape of the debris shield 136. The slanted perforations 143 aid in the capture, the blocking and deflect captures debris, and particularly debris flowing axially with respect to the fuel bundle assembly 10.

The wavy shape of the debris shield 136 also assists in securing the debris shield in the slot 134 by causing the upper ridges and lower grooves 133 of the debris shield 136 to be biased against the upper and lower surfaces of the slot 134, when the debris shield is position within the cavity of the upper tie plate. Further, the upper ridges and lower grooves 133 may be solid and have no perforations at their upper and lower apexes. The ridges and grooves 133 may be devoid of coolant flow openings so as to avoid vertically aligned perforations that may tend to pass foreign debris particles that would be blocked by the slanted openings 143 on the angled sides 137 of the upper ridges and lower grooves 133. Further, the solid groove forms a V-shaped channel 139 to capture and hold foreign debris. The debris may remain in the V-shaped channel until the debris shield 136 is removed from the upper tie plate 130. Foreign particulates may become lodged or trapped within the debris shield 136, because of the upper end plugs of fuel rods and water rods 19, 24 and 30, sticking through the solid portions of the V-shaped grooves and ridges 133 on the debris shield 136. A lower pressure gradient is created by coolant flowing through the opening from below and through the slanted openings 143 on the angled sides 137 of the debris shield 136. Upper end plugs first pass through the lower matrices 158 of the upper tie plate, then through the debris shield 136, where the solid V-shaped grooves and ridges are located within the channel 139. Next the upper end plugs are allowed to pass through the upper matrices 156 of the upper tie plate, where they may be are terminated. When the debris shield is removed, the debris captured within the V-shaped channel may be washed off, vacuumed, and/or vibrating from the debris shield, the debris shield 136 is thereafter reinserted once again back within the upper tie plate. Alternatively, the debris shield 136 with the captured debris may be discarded and a new debris shield re-inserted into the upper tie plate.

Figure 8:
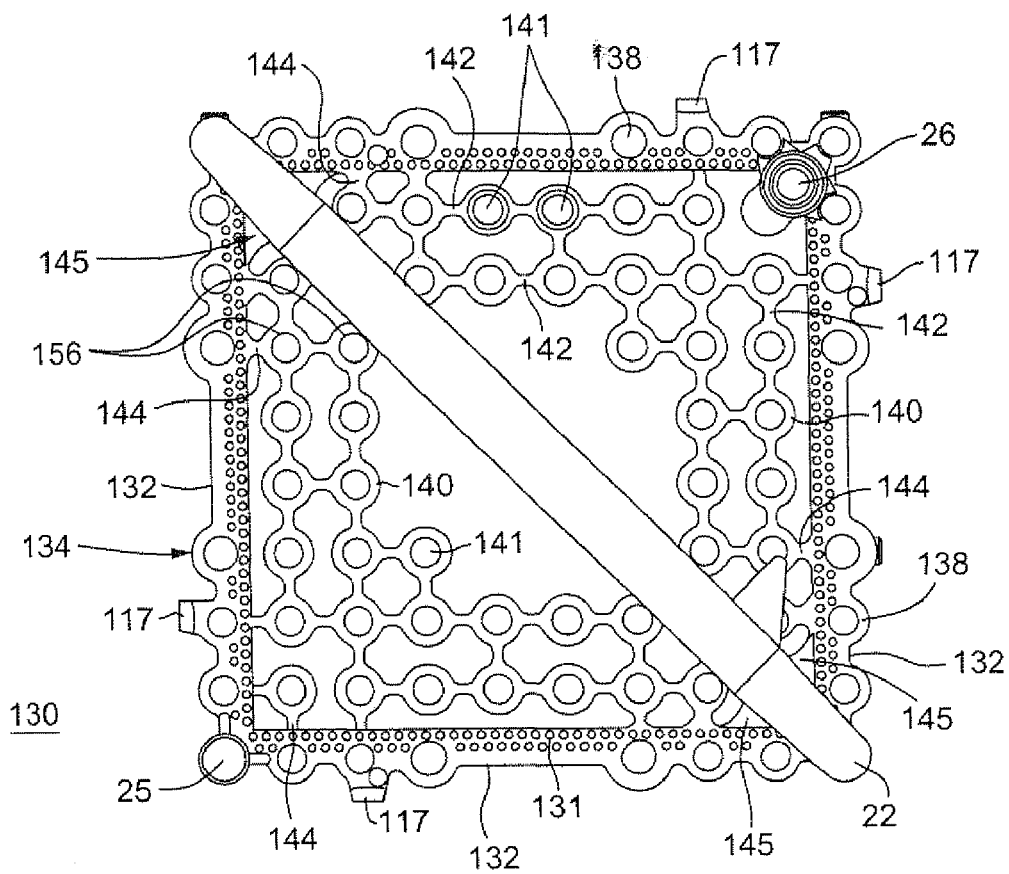
FIG. 8 is a top-down view of the second embodiment of the upper tie plate, without a debris shield being inserted.
Figure 9:
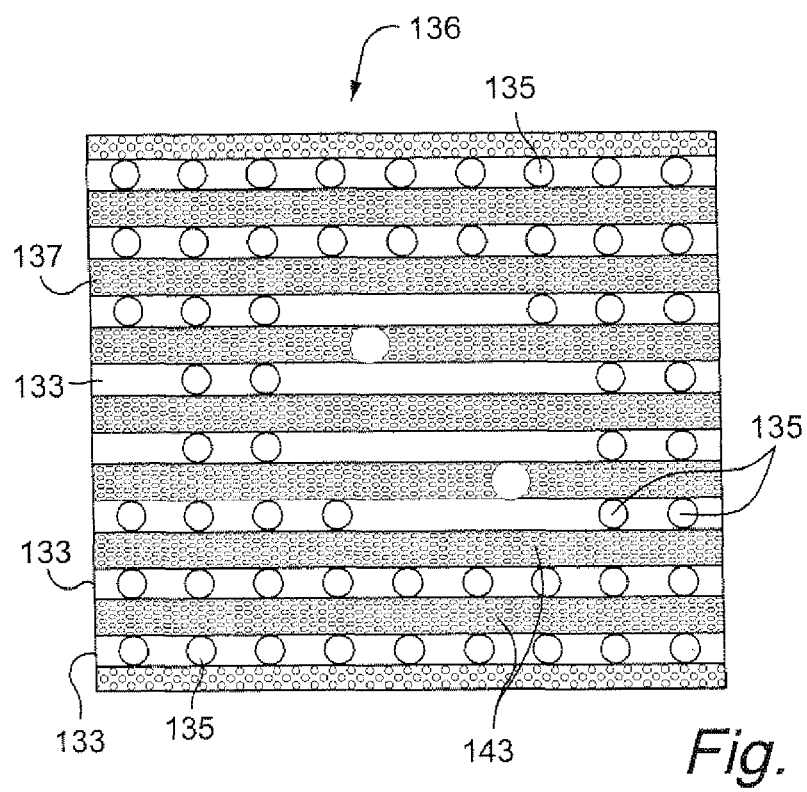
FIG. 9 is a top-down view of the debris shield associated with the second embodiment of the upper tie plate showing the passages for fuel rods and water rods upper end plug. The debris shield has slanted sides to allow for the passage of coolant flow, while the solid portions of the debris shield trap falling debris within the debris shield. Debris that passes through the grid of the upper tie plate, will settle between the solid portions of the debris shield and the upper end plugs passing through the debris shield. Debris is collected and held within the debris shield because of a pressure gradient (vacuum) that is created by the debris shield design.

FIGS. 8 and 9 is a top-down view of the upper tie plate assembly 130. The metal matrices 140 of pin supports 141 and ribs 142 interconnecting the pin supports and ribs 144 connecting the horizontal support frame 132 to the matrices are clearly shown in FIG. 8. The matrices 140 may include an upper planar matrix 156 of pin supports and interconnecting ribs, and a lower planar matrix 158 of pin supports and interconnecting ribs. The upper and lower planer matrix may have identical patterns of pin supports and ribs. The upper and lower planar matrices 156, 158 define an upper and lower surface of the slot 134 that receives the debris shield 136. Alternatively, the matrices 140 may also be a single planar matrix that is arranged immediately above or below the debris shield 136.

The metal matrices 140 are mounted to the horizontal support frame 132 and extend over an open area inside of the horizontal support frame. The metal matrices 140 may be formed by the machining of a metal casting, casting, or the complete machining of the upper tie plate assembly. The matrix 140 may be attached to the horizontal support frame and to each other by spokes, rods or a matrix structure (collectively matrix structure). The pin supports 141 in the metal matrices 140 include cylindrical supports 141 to receive fuel rod end couplings, e.g., threaded pins of tie rods 24 and expansion springs 16 of fuel rods 11 and the upper end plugs of the water rods 23 and 230. The matrices 140 may include solid metal braces 145 especially near the corners and below the supports for the handle 22.

FIG. 9 is a top-down view of the debris shield plate 136. The pin supports 135 for the threaded ends 28 of the tie rods and the upper end plugs for fuel rods 11, and the water rods 23 and 230, are arranged to align with the pin support cylinders 141 in the upper matrices 156 and lower matrices 158 of the upper tie plate assembly 130. The pin supports are substantially larger than the flow passages through the debris shield 136. The pin supports are filled with the upper end plugs 19, 30 and 28 that are attached to the ends of the water rods, 23, 230 and the fuel rods 11 and 24, that by themselves do little to limit fluid passage around the pin supports 141. However, once the debris shield 136 has been installed within the upper tie plate 130 cavity, fluid leakage through each of the matrices are restricted around each of the pin support, for fluid leakage.

The angled sides 137 of the upper ridges and lower grooves 133 contain the pin supports 135 in the debris shield 136 for receiving the threaded ends 28 of tie rods 24, fuel rods 11, water rods 23, 230 and upper end plugs for each type of pin design. These pin supports 135 will be filled by the rod's upper end plugs, which block foreign debris and fluids that might otherwise may flow through the pin supports.

Figure 10:
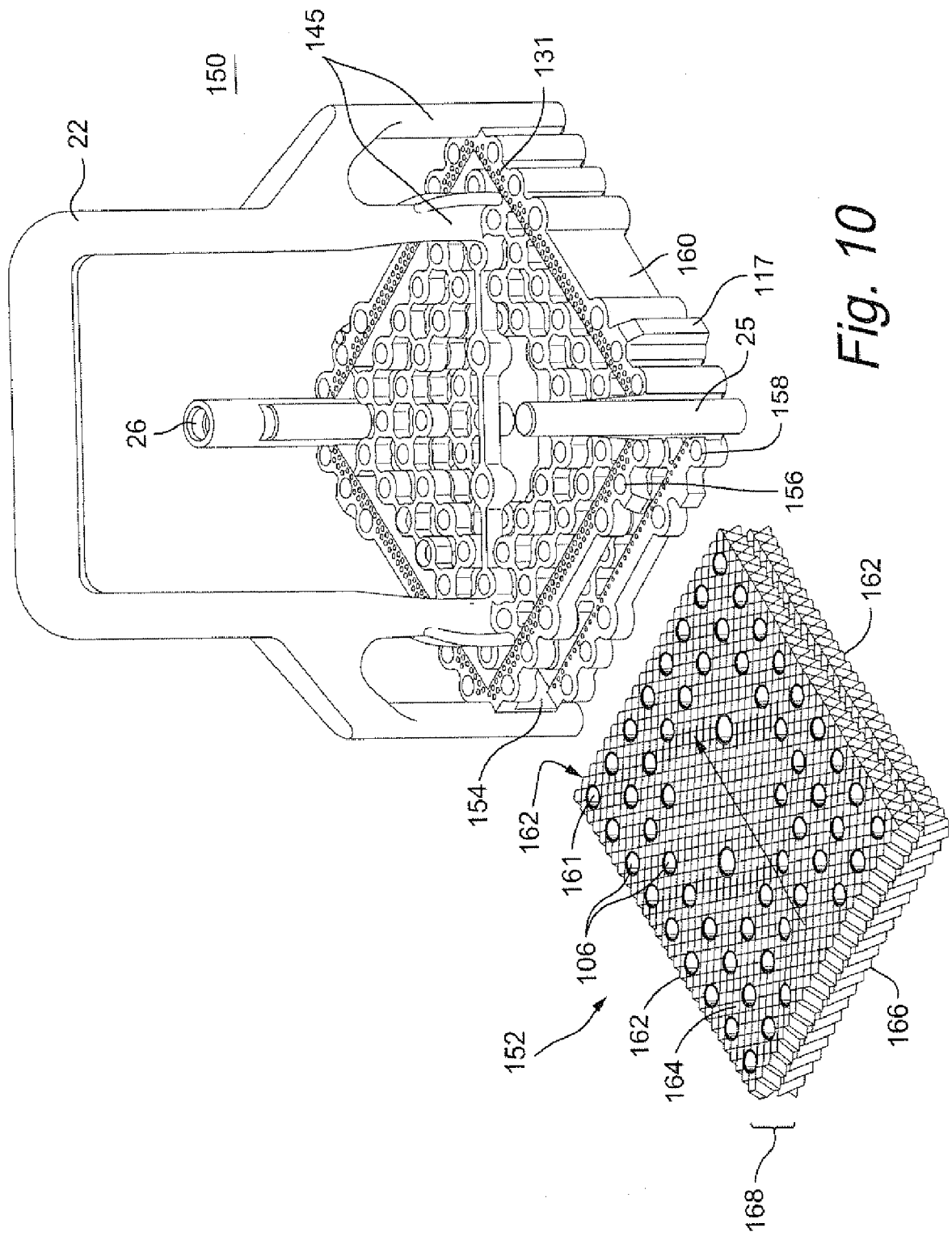
FIG. 10 is a perspective view of the top and sides of a third embodiment of an upper tie plate having a removable debris shield which can be a removable unit or attached as a permanent integrated structure within the upper tie plate, wherein the debris shield with water and fuel rod pin passages is shown out of the upper tie plate. The arrow shows the insertion direction of the debris shield into the upper tie plate.
Figure 11:
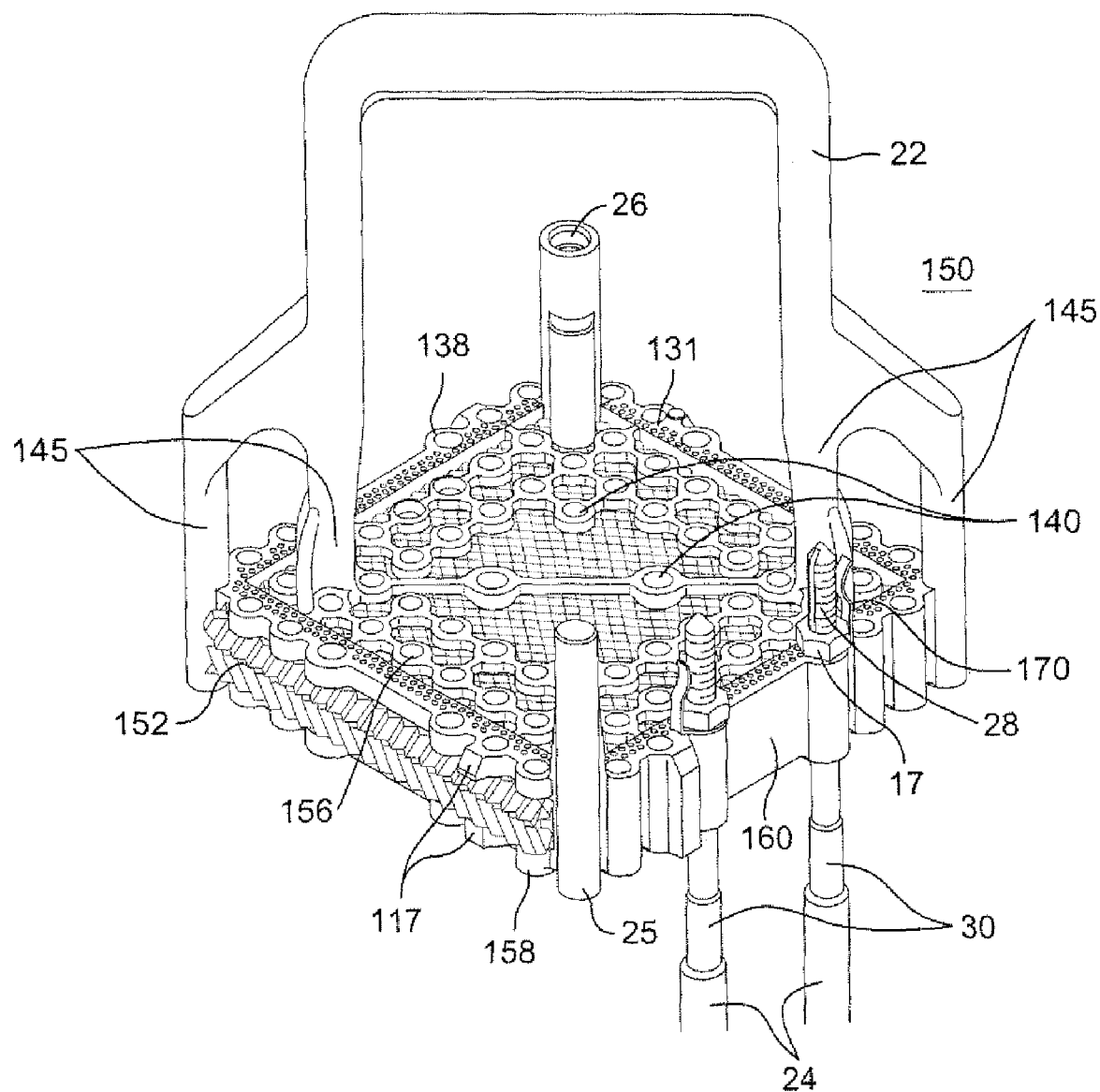
FIG. 11 is a perspective view of the top and sides of the third embodiment of an upper tie plate having a removable internal debris shield, wherein the shield is shown properly aligned and seated within a cavity of the upper tie plate.
Figure 12:
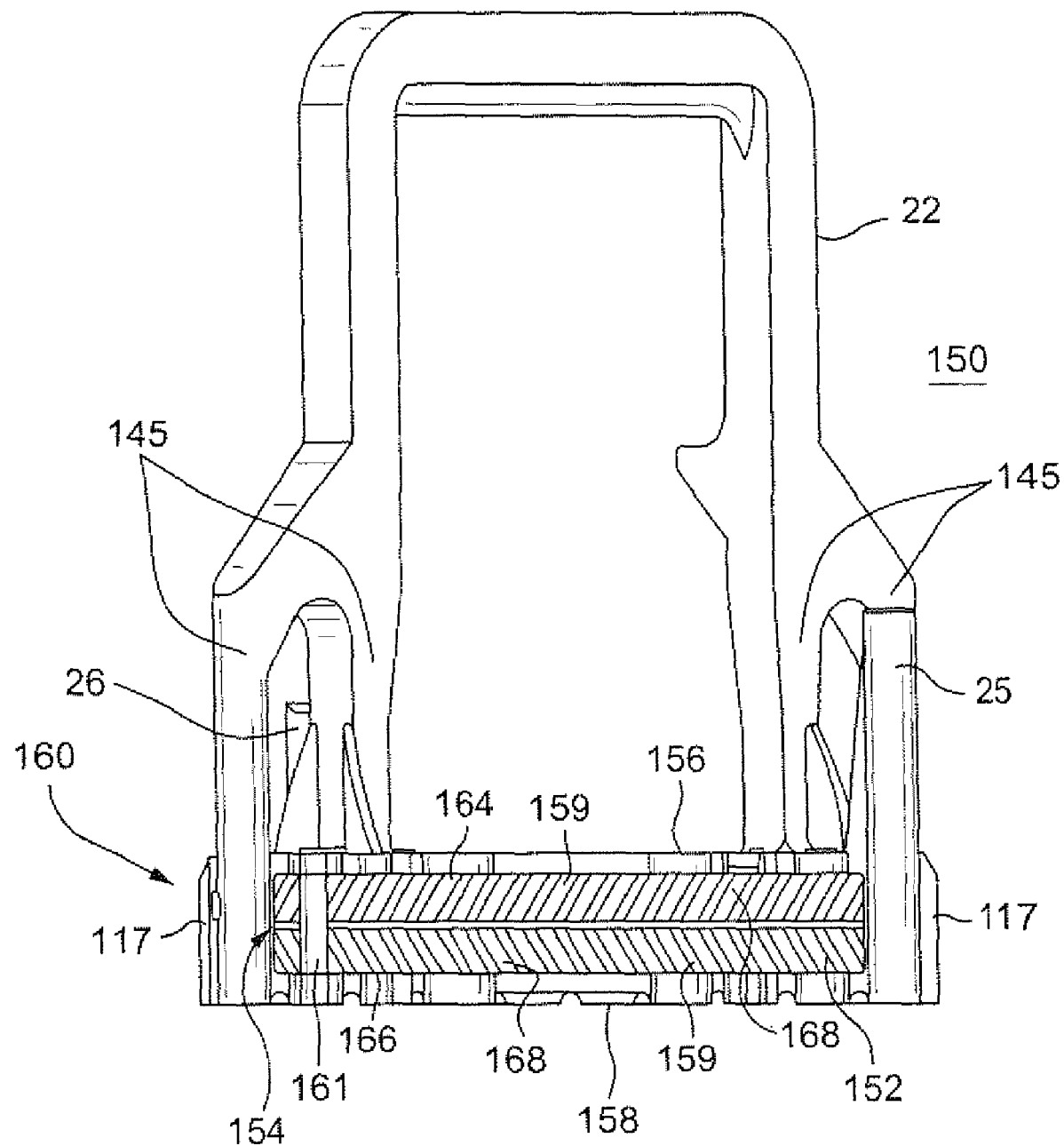
FIG. 12 is a side view of the third embodiment of the upper tie plate and of the debris shield fully seated and aligned within the grid structure for the upper tie plate.

FIG. 10 shows a third embodiment of an upper tie plate assembly 150 as a honey comb design, having a removable debris shield 152 that slides in a horizontal slot 154 between an upper planar section 156 and a lower planar section 158 of the upper tie plate assembly 150. The debris shield 152 may be a removable unit or a permanent integrated structure in the upper tie plate. In FIG. 10, the debris shield 152 is shown being inserted into the slot 154 of the upper tie plate. FIG. 11 shows the debris shield 152 fully inserted and secured within the upper tie plate assembly 150. FIG. 12 is the side view of the debris filter 152 fully inserted into the upper tie plate cavity 154. FIGS. 13 and 14 show top and bottom views, respectively, of the upper tie plate assembly 150.

A three-sided frame 160 of the upper tie plate assembly 150 holds together the upper and lower planar sections 156, 158. The frame has sidewalls on three of its four sides. The fourth side is open and forms the slot or cavity 154 for the debris shield 152. The frame may be porous, e.g., have small vertical openings 131 to allow fluid to pass through the frame and block the passage of foreign debris. The openings in the frame increase the effective flow area of passages through the upper tie plate assembly 150 and thereby compensate or offset any flow restrictions due to the debris shield 152 once the debris shield is placed within the slot or cavity 154 of the upper tie plate. Datum points 117, e.g., vertical outer ribs, attached to the three sided horizontal support frame 160 centers the hollow metal channel 20 with the upper tie plate and are used during fabrication to square the upper tie plate 150 assembly to the fuel rods and the water rods. The horizontal support frame 160 of the upper tie plate, supports a lifting handle 22 and the channel posts 25 and 26. A channel fastener clips (not shown) are used to secure the hollow metal channel 20 to the threaded channel post 26.

The horizontal support frame 160 includes upper and lower planar sections 156, 158 that are load bearing structures of the upper tie plate 150, and provide structural support for the debris shield 152, hollow metal channel 20, tie rod 24 and other components of the nuclear fuel bundle assembly 10. Optionally, a structurally strong debris shield 152 may serve as a load bearing structure and replace one or more of the upper and lower planar sections 156, 158 and part or all of the horizontal support frame 160. The debris shield 152 includes pin support apertures 161 to receive the fuel rod 30 and 24, and the upper end plugs 19 of the water rod, for example, and that are aligned with the pin supports 141 of the upper and lower planar sections 156, 158 of the upper tie plate assembly 150.

The debris shield 152 may be generally planar and have edges 162 (FIG. 10) that abut the interior walls of the horizontal support frame 160, and upper debris shield surfaces 164 and lower surface 166 that are adjacent interior surfaces of the upper and lower planer sections 156 and 158 of the upper tie plate. The debris shield may slide horizontally into the slot 154. Because of the thickness of the debris shield 152 is nearly the same approximately size the same as the width of the slot 154, a slight force may be needed to place the debris shield fully within the cavity 154 of the upper tie plate assembly 150. The debris shield is slid into the slot 154 and the pin supports 161 of the debris shield 152 are aligned with the pin supports 161 in the upper and lower planar sections 156, 158 of the horizontal support frame 160. After the debris shield 152 is fully inserted within the slot 154, the tie rods 24, the water rods 23 and 230 and the full-length fuel rods 11 upper end plugs, are inserted into the aligned pin supports of the frame and the debris shield 152.

Alternatively, the debris shield 152 may be seated in a bottom cavity of the upper tie plate 150, if the horizontal support frame 160 of upper tie plate lacks a lower planar section 158. With the alternative upper tie plate, the tie rods and end plugs may be inserted in the pin supports 161 of the debris shield 152 before the upper tie plate is placed on the fuel bundle 32. Further, the upper tie plate may be removed from the fuel bundle 32, while the fuel rod 11, and the water rods 23 and 230, and the tie rods 24 are left attached, or secured to the debris shield 152.

The debris shield 152 may be a honey-combed metallic structure, a wire or fabric mesh, sponge, grid, array of crossing bars or slats, or other matrix that is porous. The material forming the shield should withstand service in a nuclear reactor core. Preferably, the passages through the debris shield are not entirely straight and include at least one bend or curve. Bends and curves in passages of the debris shield tend to trap debris, especially strands of chips, wires and rods. The passages through the debris shield 152 may be numerous to minimize any fluid pressure drop across the debris shield, while maintaining the debris screening, or filtering function of the debris shield. Fluid flows through the disjointed passages, but debris is filtered out of the fluid by the debris shield. A characteristic of the debris shield may be that light does not shine through the debris shield because of the bends and curves in passages.

The bends and curves (see FIG. 12) in the flow passages 159 of the debris shield 152 may be formed by laminating two or more layers 168 of debris shield material, e.g., a honey-combed metallic layer, such that the passages in each layer are not aligned. By way of example, the passages in each layer may be angled, e.g., 5 degrees to 45 degrees, with respect to the axis of the fuel bundle assembly 10. The direction or slope of the passage angles in each layer 164, 166 may be different so that the layers form disjointed passages 159 through the laminated debris shield 152. Alternatively, the debris passages through each layer of the debris shield may be offset with respect to the passages of adjacent layers and gaps between the layers to allow fluid to pass through the debris shield with relatively small fluid resistance.

The debris shield 102, 136 and 152 may remain in the fuel bundle assembly 10 during operation of the nuclear reactor core. The debris shield preferably has a porosity that allows coolant, especially emergency coolant, to flow downward through the debris shield without substantial flow resistance. The porosity and disjointed fluid passages of the debris shield blocks the passage of debris. The debris shield serves as a screening device or a filter that allows passage of fluids, such as cooling fluid, and blocks the passage of particulates. Preferably the debris shield should block the passage of particles of debris material having a pore size that minimizes the size of the debris while maintaining the optimal flow of coolant.

The debris shields 102, 136 and 152 shown herein are exemplary shields. The debris shield 102 may be configured as a plate, having a chevron porous structure in cross-section, and integral to the upper tie plate. The debris shield 102 is a load bearing structure that includes apertures to receive and support tie rods, fuel rods and the upper end plugs of a fuel bundle assembly 10. Because of the load bearing debris shield 102, upper and lower planer support structures are not needed. The debris shield 136 may be formed of one or more layers of porous metallic layers. The layers may have a wavy cross-sectional shape that imparts a slant to the passages in the shield and thereby may improve the filtering function of the shield. The debris shield 136, as shown, is not load bearing and is inserted in a slot of a load bearing frame of the upper tie plate. The debris shield 152 may be a laminated plate having layers 168 and flow passages 159 that are disjointed and have bends and curves to trap debris. The debris shield 152 may be a non-load bearing and has apertures through which pass tie rods, fuel rods and upper end plugs that attached to openings in upper and lower planer sections of the upper tie plate. Alternatively, the debris shield 152 may be load bearing, having pin support apertures and seats in a bottom cavity of a frame 160 of an upper tie plate having an upper (but not lower) planer matrix of pin supports and ribs, such as shown in FIGS. 2, 3 and 4.

The debris shields 102, 136 and 152 block downwardly flowing debris, have relatively little resistive area to emergency cooling flow and allow recirculation of fluid flowing through and around the shield to the top of the bundle during application of the emergency core cooling system. Debris shields having other shapes, compositions and arrangements in the top of a fuel bundle assembly 10 may be fashioned to serve the function of preventing debris falling into a bundle, in substantially the same way of blocking passage of debris falling downward into the bundle while passing coolant, to achieve the result of substantially no debris being introduced in the bundle due to debris falling down past the upper tie plate.

Each of the three embodiments of the debris shield 102, 136 and 152 are suitable for blocking screening, and filtering debris from coolant flow passing through the upper tie plate. The debris shield 102 (first embodiment) may be held in place by, for example, one or more of the following methods: (i) threaded upper end plugs 28 of the tie rods 24, (ii) the water rods 23, 230 upper end plugs 19, (iii) the full length fuel rods 11 upper end plugs 30 within the fuel bundle assembly 10, and (iv) a binding force exerted between the cavity opening in the upper tie plate for the debris shield and the debris shield itself. Further, the debris shield 102 may be a removable unit or a permanent integrated structure mounted within the upper tie plate. In addition, the debris shield 102 may be a removable unit or a permanent integrated structure in the upper tie plate and above the fuel rods, wherein the debris shield has a surface at least co-extensive with an open area of the fuel bundle inside the hollow metal channel 20.

The debris shields 102, 136 and 152 may be used in a method to prevent debris falling into a nuclear reactor fuel bundle assembly 10, including a bundle of fuel rods mounted below an upper tie plate and housed in a hollow metal channel 20, the method comprising: inserting a debris shield which can be either a removable unit, or attached as a permanent integrated structure within the upper tie plate. Similarly, a method has been developed of maintaining the debris shield in the upper tie plate and above the fuel rods, while the fuel bundle assembly 10 is in an operating nuclear reactor core; flowing coolant through the bundle and the debris shield during operation of the nuclear reactor core, capturing screening or deflecting and the removal of debris falling in the fuel bundle assembly with the debris shield. The debris shields 102, 136 and 152 deflect, catch or remove foreign materials potentially introduced into the top of the fuel assembly.

The debris shields 102, 136 and 152 may themselves provide structural support for the bundle and thereby render unnecessary a separate array of pin supports in the upper tie plate. Accordingly, the upper tie plate may comprise a rigid debris shield to which is attached the fuel rods, water rods and possible tie rods, wherein the upper tie plate does not include a conventional pin support array.

Coolant flows through the debris shield 102, 136 and 152 is preferably without substantial pressure loss across the debris shield. To reduce the flow resistance of the debris shield, the flow passages may be relatively wide but slanted. The slanting of the passages in the debris shield enhances the ability of the shield to trap, screen or filter debris. Due to slanting, small debris particles cannot flow directly through the shield and will tend to become trapped or lodged within the shield. The view through the debris shield is blocked because the non line-of-sight passages in the debris shield prevent a top-down line-of-sight view through the upper tie plate assembly.

The debris shield 102, 136 and 152 serves as a screen or as a filter that allows passage of fluids, such as coolant, and blocks the passage of particulates. The debris shield preferably has a porosity that allows coolant, especially emergency coolant, to flow downward through the debris shield without substantial flow resistance. Preferably the debris shield should have a pore size that minimizes the size of the debris without imposing a significant fluid pressure drop across the debris shield. The debris shield 102, 136 and 152 may be formed of a porous material, such as a wire or fabric mesh, sponge, grid, array of crossing bars or slats, or other matrix material. The passages of the debris shield are preferably too narrow to allow larger debris particles to enter the passages. Further, the frame of the upper tie plate may be porous, e.g., have small vertical openings to allow fluid to pass through the frame and block passage of debris. The openings in the frame increase the effective flow area of passages through the upper tie plate and thereby compensate or offset any flow restrictions due to the debris shield.

The debris shield 136 may have a wavy cross-sectional shape that results in openings in the shield that slant with respect to the vertical axis of the fuel bundle assembly 10. The slant in the opening is advantageous in blocking and trapping debris. The wavy shape of the debris shield 136 assists in securing the debris shield in the slot by causing the upper ridges and lower grooves of the debris shield to be biased against the upper and lower surfaces of the slot. The upper ridges and lower grooves 133 of the debris shield contain the apertures for receiving the threaded ends of tie rods, fuel rods, water rods and upper end plugs for each type. The debris shield 136 preferably has porosity in the sides between the upper and lower most portions of the grooves and ridges that allows coolant, especially emergency coolant, to flow downward through the fuel bundle assembly, while retaining the captured debris that's fallen from above the fuel bundle assembly 10.

A structurally strong debris shield 152 may serve as a load bearing structure and replace one or more of the upper and lower sections of the frame. The debris shield 152 may be a honey-combed metallic structure, a wire or fabric mesh, sponge, grid, array of crossing bars or slats, or other matrix that is porous. The passages through the debris shield may be numerous to minimize any fluid pressure drop across the debris shield, while maintaining the debris screening and filtering functions of the debris shield.

Figure 15C:
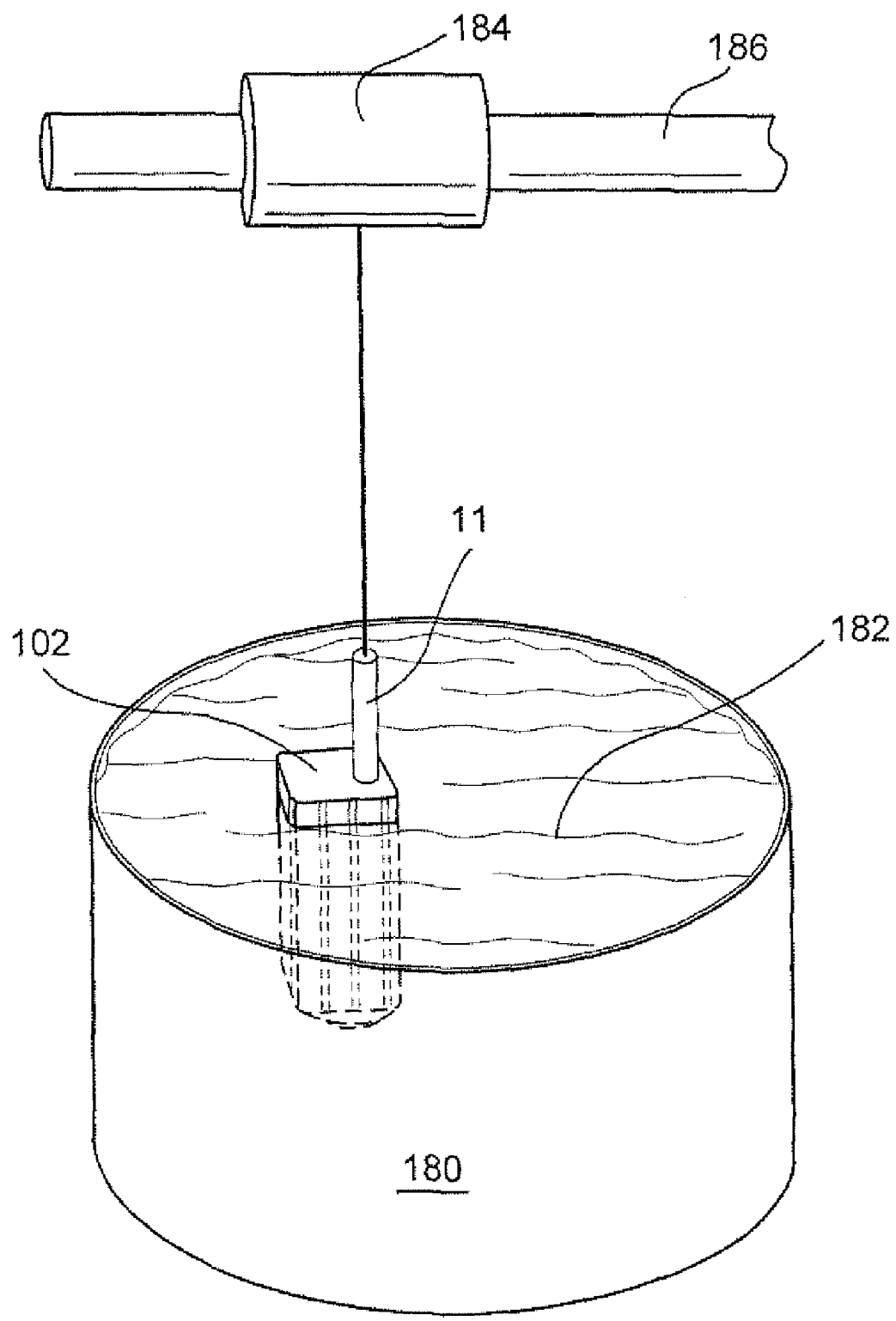

FIGS. 15a, 15b and 15c are schematic diagrams showing a maintenance or fuel inspection pool 180 to receive fuel bundle assemblies 10 that have been removed from the reactor core 21 for maintenance and service. Coolant/moderator 182 generally covers the fuel bundle assemblies in the reactor core and maintenance or fuel inspection pool.

As shown in FIG. 15a, a crane 184 grasps the handle of a fuel bundle handle and lifts the fuel bundle assembly 10 from the reactor core. The crane 184 moves the fuel bundle assembly, such as along an overhead beam 186, to the maintenance or fuel inspection pool 180. The crane lowers the fuel bundle assembly in the maintenance or fuel inspection pool.

As shown in FIG. 15b, the hollow metal channel 20 has been removed and the fuel bundle 32 is ready for inspection and service in the maintenance or fuel inspection pool 180. The debris shield 152 may be removed from the upper tie plate by sliding the debris shield horizontally to remove it from a slot or cavity 154 in the upper tie plate. Once removed, the debris shield may be cleaned and inspected and reinserted into the slot of the upper tie plate. Alternatively, the debris shield may be replaced with a new debris shield which is inserted into the slot of the upper tie plate.

As shown in FIG. 15C, the upper tie plate may be removed from the fuel bundle assembly while the debris shield 102 remains attached to the upper portion of the fuel bundle 32 and the channel is removed. The upper tie plate may be replaced or serviced and then reinstalled over the debris shield and onto the fuel bundle 32.

After the upper tie plate has been removed, the debris shield may then be taken off the fuel bundle 32 by removing the hex nuts that secure the water rods 23 and 230 upper threaded end plugs to the debris shield. Once removed from the fuel bundle, the debris shield can be cleaned to remove debris trapped in the shield. Alternatively, the debris shields may be replaced with a new debris shield.

Further, after the upper tie plate has been removed and while the debris shield 102 remains attached to the water rods 23 and 230, of the fuel bundle 32, one or more fuel rods 11, 12 may be removed through openings in the debris shield. Specifically, the upper end of the fuel rod is inserted in a cylindrical pin support 106 (FIG. 3) that is seated in an opening of the debris shield. The opening in the debris shield is sufficiently wide to pass a fuel rod and the expansion spring. The cylindrical pin supports 106 may be securely seated in the debris shield by an upper grid matrix of pin supports in the upper tie plate or by lock washers, hex nuts 17 or other securing mechanisms that releasably secure the cylindrical pin supports to an upper surface of the debris shield. The cylindrical pin supports allow an upper end of the fuel rod to extend through the support and may provide an upper end stop for the expansion springs on the fuel rods.

To remove the fuel rod 11, 12, the upper end of the fuel rod is grasped and pulled upward such that fuel rod, cylindrical pin support and expansion spring moves as an assembly up through the opening in the debris shield 102. A single fuel rod may be removed from the fuel bundle while debris shield is covering and supporting the fuel bundle, once the upper tie plate has been removed. Similarly, an assembly of a fuel rod, expansion spring and cylindrical pin support may be inserted in the fuel bundle by lowering the assembly through the opening in the debris shield such that the cylindrical pin support seats in the opening the debris shield.

The debris collected by the debris shield may be inspected to detect potential problems in the nuclear reactor core 21. The debris captured by the debris shield potentially may be broken pieces of components from the nuclear reactor core, lose components, metal shavings produced by rubbing of components and other fragments. Inspection by operates of the debris from the debris shield may indicate a problem in the nuclear reactor core. Based on the inspection, the operator may determine or at least suspect that a component of the nuclear reactor core may require repair, replacement or at least further inspection. Accordingly, inspection of the debris from the debris shield may be performed while or after the debris shield is removed from the upper tie plate and fuel bundle 32.

The cleaned or new debris shield is applied to the fuel bundle in much the same manner that it was removed. The hollow metal channel 20 is reattached to the fuel bundle 32. The completed fuel bundle assembly is lifted by the crane from the maintenance or fuel inspection pool 180 and placed in its proper location in the array of fuel bundle assemblies in the reactor core. The fuel bundle assembly may not be returned to its original location. Rather, the fuel bundle assembly 10 may be returned to a different location in the reactor core, where the location is determined based on reactor performance. Removal of a single fuel rod, as is describe above, provides the ability to remove one or more fuel rods from a fuel bundle without removing the debris shield or other components of the fuel bundle, except for the upper tie plate. The upper tie plate and individual fuel rods can be repaired or replaced without completely disassembling the fuel bundle. Accordingly, repairing and replacing upper tie plates and individual fuel rods may be preformed while the fuel bundle is in the maintenance/inspection pool. Performing these repairs and replacements in the maintenance/inspection pool and without disassembling the entire fuel bundle saves time and money by reducing the amount of work required to service the upper tie plate or replace individual fuel rods.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method to clean or replace a debris shield in a nuclear reactor fuel bundle assembly for a nuclear reactor core, the assembly including a bundle of fuel rods mounted below an upper tie plate and housed in a channel, the method comprising:
   (a) inserting a debris shield in the upper tie plate;
   (b) maintaining the shield in the upper tie plate and above the fuel rods, while the fuel assembly is in the operating nuclear reactor core;
   (c) flowing coolant through the bundle and the debris shield during operation of the nuclear reactor core;
   (d) capturing or deflecting debris falling down to the fuel assembly with the debris shield;
   (e) after steps a to d, removing the fuel bundle assembly from the nuclear reactor core, and
   (f) after step (e) removing the debris shield from the upper tie plate.

2. The method in claim 1 further comprising after step (f) inserting at least one of the debris shield and another debris shield in the upper tie plate and positioning the fuel bundle assembly into the nuclear reactor core.

3. The method in claim 1 wherein debris is captured or deflected while coolant flow is stagnant or reversing.

4. The method in claim 1 wherein after step (e) the fuel bundle assembly is moved to a maintenance or fuel inspection pool and step (f) is performed while the fuel bundle assembly is in the maintenance pool.

5. The method in claim 4 further comprising:
   after step (f) and while the fuel bundle assembly is in the maintenance or fuel inspection pool inserting at least one of the debris shield or and another debris shield in the upper tie plate, and positioning the fuel bundle assembly into the nuclear reactor core, and
   after step (f) moving the fuel bundle assembly from the maintenance or fuel inspection pool to the nuclear reactor core.

6. The method in claim 1 wherein step (f) includes removing the debris shield from a slot in a frame of the upper tie plate.

7. The method in claim 6 wherein the debris shield is removed by being slid horizontally from the slot.

8. The method in claim 1 wherein step (f) further includes removing the upper tie plate while the debris shield remains attached to the fuel rods and thereafter removing the debris shield.

9. The method in claim 1 wherein the upper tie plate includes a rectangular frame and the method further comprises supporting a tie rod in the rectangular frame of the upper tie plate, wherein the frame defines a generally horizontal open area and the debris shield covers the open area.

10. A method to capture and remove debris falling into a nuclear reactor fuel bundle assembly a nuclear reactor core, the assembly including a bundle of fuel rods mounted below an upper tie plate and housed in a channel, the method comprising:
inserting a debris shield in the upper tie plate;
maintaining the shield in the upper tie plate and above the fuel rods, while the fuel bundle assembly is in an operating nuclear reactor core;
flowing coolant through the fuel rods and the debris shield during operation of the nuclear reactor core;
capturing debris falling in the fuel assembly on the debris shield;
after capturing the debris, removing the fuel bundle assembly with the inserted debris shield from the nuclear reactor core to a maintenance or fuel inspection pool and thereafter removing the debris shield from the upper tie plate, performing at least one of (a) removing the captured debris from the removed debris shield and thereafter reinserting the debris shield into the upper tie plate and (b) inserting another debris shield into the upper tie plate, and
after the reinsertion of the debris shield or the insertion of the another debris shield, moving the fuel bundle assembly from the maintenance or fuel inspection pool to the nuclear reactor core.

11. The method of claim 10 wherein the reinsertion of the debris shield or the insertion of another debris shield includes sliding the debris shield in a horizontal slot in the upper tie plate.

12. The method of claim 10 wherein the reinsertion of the debris shield or the insertion of another debris shield includes lifting the upper tie plate up and off of the debris shield while the debris shield remains attached to the fuel rods, and thereafter removing the debris shield from the fuel rods.

13. The method in claim 10 wherein debris is captured while coolant flow is stagnant or reversing.

14. The method in claim 10 wherein inserting the debris shield includes positioning the debris shield in an opening of the upper tie plate.

15. The method in claim 10 wherein the debris shield includes an aperture and the method further comprises supporting a tie rod in an aperture of the debris shield.

16. The method of claim 10 wherein the insertion of the debris shield includes positioning the debris shield below and adjacent a lower surface of the upper tie plate.

17. A method to seat an upper tie plate in a fuel bundle assembly for a nuclear reactor, wherein the fuel bundle assembly includes fuel rods, at least one water rod, tie rods, and a channel, the method comprising:
attaching a debris shield to upper portions of the fuel or water rods, wherein the debris shield includes openings to receive the upper portions and apertures narrower than the openings, and the openings extend through an area of the debris shield having the apertures, and
after attaching the debris shield, seating the upper tie plate over the debris shield and securing the upper tie plate to the tie rods of the fuel bundle assembly.

18. The method of claim 17 wherein the upper tie plate includes a lower cavity and the seating step includes fitting the lower cavity in the upper tie plate over the debris shield.

19. The method of claim 17 further including removing the upper tie plate while the debris shield remains attached to the upper portions of the fuel or water rods.

20. The method of claim 19 further including removing at least one of the fuel rods through one of the openings in the debris shield while the upper tie plate is removed and while the debris shield remains attached to one the upper portions of at least one of the fuel rods.

21. The method of claim 17 wherein the upper portions of the fuel rods include end plugs and the end plugs are attached to the debris shield.

22. A method to remove a fuel rod from a fuel bundle for a nuclear reactor, wherein the fuel bundle includes a bundle of fuel rods and a water rod mounted below the upper tie plate, the method comprising:
removing the upper tie plate from the fuel bundle, while the debris shield remains attached to an upper portion of at least one of the fuel rods or of a water rod, and
after removing the upper tie plate, removing the fuel rod by lifting the rod up through the debris shield, while the debris shield remains attached to an upper portion of at least one of the fuel rods or of the water rod.

23. The method of claim 22 wherein the removed fuel rod is not threaded and the fuel rod or water rod attached to the debris shield is threaded.

24. The method of claim 22 wherein the at least one of the fuel rods is configured to receive an expansion spring, and the at least one of the fuel rods is removed with the expansion spring mounted on the removed fuel rod.

25. The method of claim 24 wherein the expansion spring extends up through the debris shield and abuts the upper tie plate before the upper tie plate is removed.

26. The method of claim 22 further comprising moving the fuel bundle from a nuclear reactor core to a maintenance or inspection pool, and removing a metal channel from the fuel bundle.

27. The method of claim 22 further comprising inserting a fuel rod through the debris shield in place of the removed fuel rod, and thereafter seating the upper tie plate on the debris shield.

* * * * *

UNITED STATES PATENT AND TRADEMARK OFFICE
CERTIFICATE OF CORRECTION

PATENT NO. : 8,396,182 B2
APPLICATION NO. : 12/323739
DATED : March 12, 2013
INVENTOR(S) : David Smith et al.

Page 1 of 1

It is certified that error appears in the above-identified patent and that said Letters Patent is hereby corrected as shown below:

Title Page, at item (54) and in the Specification, column 1, line 1-3, Title, delete "METHOD AND APPARATUS TO SHIELD A NUCLEAR FUEL ASSEMBLY WITH REMOVABLE DEBRIS SHIELD IN UPPER TIE" and insert --METHOD AND APPARATUS TO SHIELD A NUCLEAR FUEL ASSEMBLY WITH REMOVABLE DEBRIS SHIELD IN UPPER TIE PLATE--

In the Claims:

In Claim 20 at column 18, line 18, delete "attached to one the upper portions" and insert --attached to one of the upper portions--

Signed and Sealed this
Fourth Day of June, 2013

Teresa Stanek Rea
*Acting Director of the United States Patent and Trademark Office*